United States Patent
Kishi

(10) Patent No.: US 7,203,473 B2
(45) Date of Patent: Apr. 10, 2007

(54) RADIO EQUIPMENT

(75) Inventor: Takahiko Kishi, Yokohama (JP)

(73) Assignee: Samsung Electronics Co., Ltd. (KR)

( * ) Notice: Subject to any disclaimer, the term of this patent is extended or adjusted under 35 U.S.C. 154(b) by 588 days.

(21) Appl. No.: 10/630,190

(22) Filed: Jul. 30, 2003

(65) Prior Publication Data

US 2004/0029550 A1  Feb. 12, 2004

(30) Foreign Application Priority Data

Aug. 7, 2002  (JP) ............................. 2002-230517

(51) Int. Cl.
*H04B 1/12* (2006.01)
(52) U.S. Cl. .................... 455/305; 455/296; 375/346
(58) Field of Classification Search ............. 455/114.2, 455/296, 302, 303, 305, 323; 375/324–346
See application file for complete search history.

(56) References Cited

U.S. PATENT DOCUMENTS

| | | | | |
|---|---|---|---|---|
| 6,330,290 | B1 * | 12/2001 | Glas ........................... | 375/324 |
| 6,792,054 | B1 * | 9/2004 | Bitran et al. ................. | 375/343 |
| 6,895,045 | B2 * | 5/2005 | Ozluturk et al. ............. | 375/235 |
| 6,987,815 | B2 * | 1/2006 | Denno ......................... | 375/316 |
| 2003/0165203 | A1 * | 9/2003 | Mohindra .................... | 375/324 |
| 2003/0206603 | A1 * | 11/2003 | Husted ........................ | 375/324 |
| 2004/0156450 | A1 * | 8/2004 | Auranen et al. ............. | 375/324 |

FOREIGN PATENT DOCUMENTS

JP  10-56484  2/1998

* cited by examiner

*Primary Examiner*—Edward F. Urban
*Assistant Examiner*—Blane J. Jackson
(74) *Attorney, Agent, or Firm*—The Farrell Law Firm

(57) ABSTRACT

Radio equipment including a characteristic compensator for compensating for an orthogonality error of a mixer with low consumption power is disclosed. In radio equipment, an orthogonal detector converts a received real signal into a complex reception signal of an intermediate frequency. Further, when a complex reception signal converted into a digital signal by A/D converters includes a desired signal (quasi-desired signal), which includes an image signal of a non-desired signal, and a non-desired signal (preparatory desired signal), which includes an image signal of a desired signal, a frequency of the quasi-desired signal is frequency-converted to a signal closer to a direct current component by a frequency converter and a frequency of the preparatory desired signal is frequency-converted to a signal closer to a direct current component by a frequency converter. A decimator respectively performs a filtering and a down-sampling on the frequency-converted quasi-desired signal and preparatory desired signal. A characteristic compensator 7 suppresses the image signal of the non-desired signal included in an inputted quasi-desired signal by means of a complex codomain signal of an inputted preparatory desired signal.

8 Claims, 16 Drawing Sheets

RADIO EQUIPMENT

PRIORITY

This application claims priority to an application entitled "Radio Equipment" filed in the Japanese Industrial Property Office on Aug. 7, 2002 and assigned Serial No. 2002-230517, the contents of which are incorporated herein by reference.

BACKGROUND OF THE INVENTION

1. Field of the Invention

The present invention relates to a radio equipment, and more particularly to radio equipment including a compensator for compensating for an orthogonality error between a real-axis signal and an imaginary-axis signal of a signal expressed as a complex number.

2. Description of the Related Art

Japanese Laid-Open Patent Publication No. P10-56484 discloses a conventional receiver which employs a characteristic compensator for compensating for orthogonal/amplitude errors occurring in received signals owing to incompleteness of an apparatus.

In radio equipment including such a receiver as disclosed by the Japanese Publication, an orthogonality error of a complex signal caused by a dispersion or all characteristics of an analog processing section in mixers (frequency converters) which process RF (Radio Frequency) band of the radio equipment, such as an orthogonal modulator (a mixer having an input of a complex signal and an output of a real signal), an orthogonal detector (a mixer having an input of a real signal and an output of a complex signal), or a mixer having an input of a complex signal and an output of a complex signal, may appear as an image signal which does not exist in an ideal signal. Accordingly, in order to transceive signals without distortion, conventional radio equipment may employ a compensator for compensating for an orthogonality error of a complex signal.

However, in recent radio equipment, as the frequency of RF signal increases and system bands become wider, it is difficult to obtain a necessary degree of image suppression even if a mixer with a high image suppression effect is used. Further, since research for obtaining not only characteristic compensation of a mixer but also the necessary degree of image suppression by suppressing an image frequency signal in a RF filter, a high intermediate frequency has been necessary for a radio processing section.

Accordingly, as a conventional receiver shown in FIG. 17, when an output of an orthogonal detector 2 is sampled by ADCs (A/D converters) 3 and 4, a characteristic compensation process of the orthogonal detector 2 is performed by a characteristic compensator 50 through a digital signal processing, the compensated signal is frequency-converted by a frequency converter 51 so that an immediate frequency can be low, the converted signal is converted to a signal with low sampling frequency by a decimator 52, and the converted signal is demodulated by a detector 8, processing a high IF frequency in the output of the orthogonal detector 2 implies that a high sampling frequency is necessary when a sampling is performed. Further, in order to perform the characteristic compensation process of the orthogonal detector 2, the consumption power of characteristic compensator 50 becomes much greater.

Further, even in a case in which a characteristic compensation is performed by means of an analog circuit without conversion into a digital signal, it is difficult to secure sufficient accuracy in a passive circuit in order to perform a compensation with high accuracy in a higher frequency, and it is necessary to increase consumption power in an active circuit in order to maintain high frequency.

SUMMARY OF THE INVENTION

Accordingly, the present invention has been made to solve the above-mentioned problems occurring in the prior art, and an object of the present invention is to provide radio equipment including a characteristic compensator for compensating for an orthogonality error of mixers, such as an orthogonal modulator, an orthogonal detector, or a complex signal input complex signal output mixer, with a low consumption power.

In order to accomplish these objects, according to the preferred embodiment of the present invention, there is provided a radio equipment comprising: an orthogonal detector for obtaining a complex intermediate frequency signal with respect to a real input signal; a first frequency converter for frequency-converting a target signal outputted from the orthogonal detector into a signal with lower frequency; a second frequency converter for frequency-converting a non-target signal outputted from the orthogonal detector into a signal of a frequency symmetrical to a signal outputted from the first frequency converter and a direct current component with a frequency of zero; and a characteristic compensator for compensating for an orthogonality error between a real-axis signal and an imaginary-axis signal occurring in the target signal owing to the orthogonal detector by means of an output signal of the second frequency converter, with respect to an output signal of the first frequency converter.

In the radio equipment with such construction, the target signal and non-target in an output of the orthogonal detector are frequency-converted to a signal closer to a direct current component with a frequency of zero by the first frequency converter and the second frequency converter, and the converted signals are inputted to the characteristic compensator for compensating for an orthogonality error, thereby compensating for an orthogonality error of the orthogonal detector by means of a characteristic compensator with low sampling frequency.

Preferably, one side of the first frequency converter or second frequency converter utilizes a complex codomain signal of a complex local signal used in other side of the first frequency converter or second frequency converter as own local signal. Accordingly, in the radio equipment, since the frequency converters use the local signal in common, a local oscillator in one side of the frequency converters can be omitted, thereby simplifying the circuit construction.

In order to accomplish these objects, according to the preferred embodiment of the present invention, there is provided a radio equipment further comprising: a first filter for employing a frequency band of the target signal in the output of the orthogonal detector as a pass band, and extracting the target signal from the output signal of the orthogonal detector; and a second filter for having a pass band characteristic symmetrical to a direct current component with a frequency of zero, employing a frequency band of the non-target signal in the output of the orthogonal detector as a pass band, and extracting the non-target signal from the output signal of the orthogonal detector. Accordingly, an output of the first filter is frequency-converted to a signal with lower frequency by the first frequency converter, and an output of the second filter is frequency-converted to a signal of a frequency symmetrical to the signal outputted from the first frequency converter and the direct current component with a frequency of zero by the second frequency converter.

In the radio equipment with such construction, since the target signal and the non-target signal are certainly separated and inputted to a characteristic compensator by the first/second filters, compensation operation in the characteristic compensator can be accurately performed. Furthermore, when adaptation signal processing is used in the characteristic compensator, the adaptation characteristic can be improved.

In order to accomplish these objects, according to the preferred embodiment of the present invention, there is provided a radio equipment further comprising: a first filter for employing a frequency band of the target signal in the output of the first frequency converter as a pass band, and extracting the target signal from the output signal of the first frequency converter; and a second filter for having a pass band characteristic symmetrical to a direct current component with a frequency of zero, employing a frequency band of the non-target signal in the output of the second frequency converter as a pass band, and extracting the non-target signal from the output signal of the second frequency converter. Accordingly, a characteristic compensator compensates for an orthogonality error between a real-axis signal and an imaginary-axis signal occurring in the target signal owing to the orthogonal detector by means of an output signal of the second filter, with respect to an output signal of the first filter.

In the radio equipment with such construction, since the target signal and the non-target signal are certainly separated and inputted to a characteristic compensator by the first and second filters, compensation operation in the characteristic compensator can be accurately performed. Furthermore, when adaptation signal processing is used in the characteristic compensator, the adaptation characteristic can be improved.

The first filter and the second filter according to the present invention are complex filters for receiving and outputting a complex signal, one side of the first filter or second filter inverts a sign of an imaginary-axis side of a complex filter coefficient prepared in other side of the first filter or second filter so that the first filter and the second filter realize a band characteristic symmetrical to a direct current component with a frequency of zero.

Accordingly, in the radio equipment, since the filter uses the complex filter coefficient in common, a complex filter coefficient memory in one side of filter can be omitted, thereby simplifying the circuit construction.

The first filter and the second filter according to the present invention are filters for suppressing unnecessary frequency component through a phase process utilizing Hilbert transform.

In the radio equipment with such construction, since the phase process is performed by means of Hilbert transform, a target signal including an image signal of a non-target signal and a non-target signal including an image signal of a target signal are certainly separated and inputted to a characteristic compensator. Further, when a filtering is performed by means of a complex filter coefficient, it is necessary to perform convolution process on both a real-axis and an imaginary-axis. However, in a filter utilizing Hilbert transform, a characteristic of one side is flat. Accordingly, a process of an axis with flat characteristic can be replaced with delay process. That is, in order to harmonize delay amount of the real-axis and imaginary-axis, delay process corresponding to delay time of Hilbert conversion filter inserted in an axis of one side is performed on the axis with flat characteristic, thereby reducing the amount of operation of the filter as much as ½. Accordingly, the circuit construction can be simplified.

In order to accomplish these objects, according to the preferred embodiment of the present invention, there is provided a radio equipment comprising: a modulator for modulating a complex immediate frequency signal to transmission data; a characteristic compensator for compensating for an orthogonality error between a real-axis signal and an imaginary-axis signal occurring after a corresponding modulator with respect to the modulated complex immediate frequency signal outputted from the modulator; a first frequency converter for frequency-converting a target signal outputted from the characteristic compensator into a signal with higher frequency; a second frequency converter for frequency-converting a non-target signal outputted from the characteristic compensator into a signal of a frequency symmetrical to a signal outputted from the first frequency converter and a direct current component with a frequency of zero; an adder for adding a real-axis signal of a complex signal outputted from the first frequency converter to a real-axis signal of a complex signal outputted from the second frequency converter, and adding an imaginary-axis signal of a complex signal outputted from the first frequency converter to an imaginary-axis signal of a complex signal outputted from the second frequency converter; and an orthogonal modulator for obtaining a real output signal with respect to a complex signal outputted from the adder.

In the radio equipment with such construction, the target signal and non-target signal in an output of the modulator are generated as signals of a frequency symmetrical to a corresponding direct current component and close to a direct current component with a frequency of zero, and the generated signals are inputted to the characteristic compensator for compensating for an orthogonality error. Simultaneously, a frequency of the target signal and non-target signal in the output of the characteristic compensator is converted into a signal of transmission frequency, thereby compensating for an orthogonality error of the orthogonal detector by means of a characteristic compensator with low sampling frequency.

Preferably, one side of the first frequency converter or second frequency converter utilizes a complex codomain signal of a complex local signal used in other side of the first frequency converter or second frequency converter as own local signal.

Accordingly, in the radio equipment, since the frequency converter uses the local signal in common, a local oscillator in one side of frequency converter can be omitted, thereby simplifying the circuit construction.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
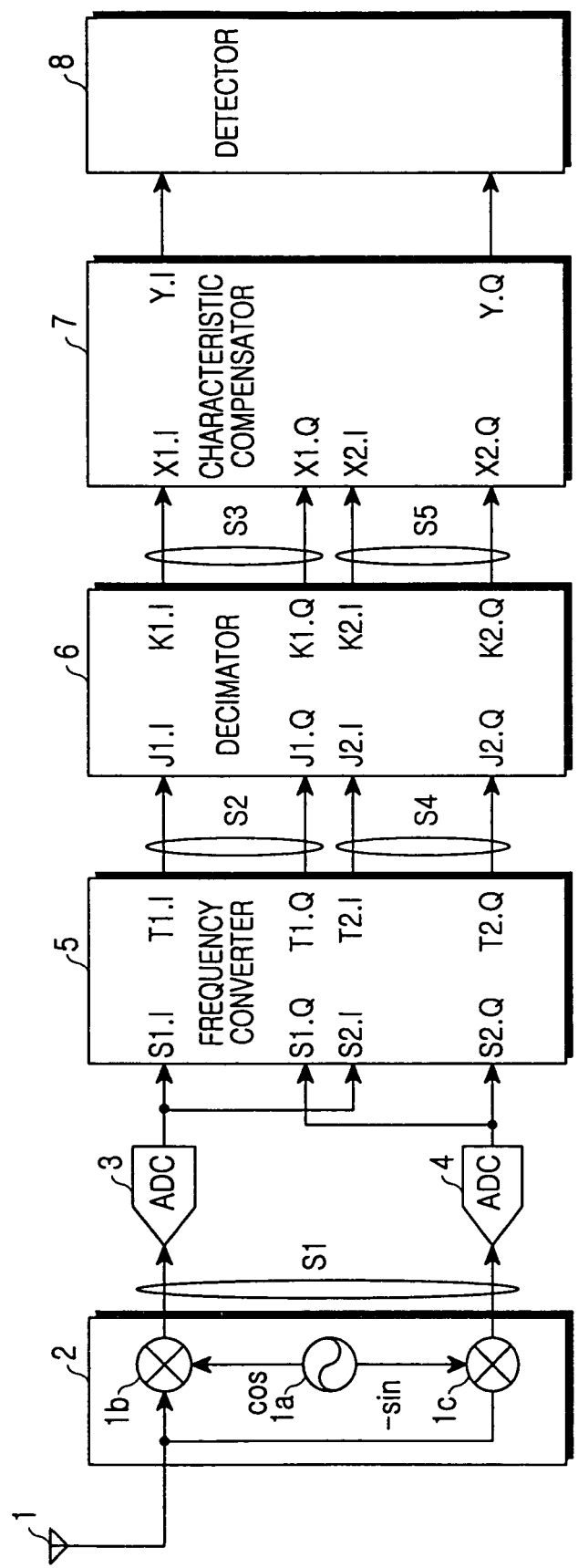
FIG. 1 is a block diagram showing a construction of a receiver realized in a radio equipment according to a first embodiment of the present invention.

Hereinafter, according to preferred embodiments of the present invention will be described with reference to the accompanying drawings. The same reference numerals are used to designate the same elements as those shown in other drawings. In the description below, many particular items, such as detailed elements of circuit, are shown, but these are provided for helping the general understanding of the present invention, it will be understood by those skilled in the art that the present invention can be embodied without the particular items. In the following description of the present invention, a detailed description of known functions and configurations incorporated herein will be omitted when it may make the subject matter of the present invention rather unclear.

A First Embodiment

FIG. 1 is a block diagram showing a construction of a receiver realized in a radio equipment according to a first embodiment of the present invention.

The receiver according to the first embodiment of the present invention is described with reference to FIG. 1. In the receiver, a signal is received through an antenna 1, and the received real signal is converted into a complex reception signal S1 of an intermediate frequency (IF frequency) by an orthogonal detector 2.

Next, when the received signal has been converted into the complex reception signal S1 of the intermediate frequency, a real-axis signal and an imaginary-axis signal of the complex reception signal S1 converted into the complex signal by an orthogonal detector 2 are respectively converted into digital signals by means of ADCs (A/D converters) 3 and 4 for quantizing an inputted signal with a predetermined sampling frequency according to a sampling theorem.

Further, in an output of the orthogonal detector 2, an orthogonality error of a complex signal caused by a dispersion or all characteristics of the processing section appears as an image signal which does not exist in an ideal signal.

Herein, in an input of the orthogonal detector 2, when an undesired signal exists in an image frequency of a desired signal in the output of the orthogonal detector 2, an image signal of a corresponding undesired signal appears in the desired signal, or an image signal of a corresponding desired signal appears in the undesired signal.

Hereinafter, the desired signal including the image signal of the undesired signal is referred to as a quasi-desired signal, and the undesired signal including the image signal of the desired signal is referred to as a preparatory desired signal. Further, the quasi-desired signal and the preparatory desired signal are described by means of equations. When a desired signal $D=\cos(\omega_1+t)$ is inputted to the orthogonal detector 2 which employs a local signal as $lo(\omega_c t)=A\cos(\omega_{c1}t)-jB\sin(\omega_{c1}t)$, the output fd of the orthogonal detector 2 is shown in the following equation 1.

$$fd(\omega t)=\cos(\omega_1 t)lo(\omega_{c1}t)=\cos(\omega_1 t)(A\cos(\omega_{c1}t)-jB\sin(\omega_{c1}t))$$

wherein, when d is A−B, $$fd(\omega t) = \cos(\omega_1 t)(A\cos(\omega_{c1}t) - j(A-d)\sin(\omega_{c1}t))$$

$$= \cos(\omega_1 t)(Ae^{-j\omega_{c1}t} + jd\sin(\omega_{c1}t))$$

$$= \frac{A}{2}(e^{j(\omega_1 t-\omega_{c1}t)} + e^{-j(\omega_1 t+\omega_{c1}t)}) + \frac{d}{4}(e^{j(\omega_1 t+\omega_{c1}t)} - e^{j(\omega_1 t-\omega_{c1}t)} + e^{-j(\omega_1 t-\omega_{c1}t)} - e^{-j(\omega_1 t+\omega_{c1}t)})$$

$$= \frac{1}{2}\left(A - \frac{d}{2}\right)(e^{j(\omega_1 t-\omega_{c1}t)} + e^{-j(\omega_1 t+\omega_{c1}t)}) + \frac{d}{4}(e^{-j(\omega_1 t-\omega_{c1}t)} + e^{j(\omega_1 t+\omega_{c1}t)})$$

When an undesired signal $U=\cos(\omega_{c2}t)$ is inputted to the orthogonal detector 2, the output fu of the orthogonal detector 2 is shown in the following equation 2.

$$fu(\omega t)=\cos(\omega_2 t)lo(\omega_{c1}t)=\cos(\omega_2 t)(A\cos(\omega_{c1}t)-jB\sin(\omega_{c1}t))$$

wherein, when d is A−B, $$fd(\omega t) = \cos(\omega_2 t)(A\cos(\omega_{c1}t) - j(A-d)\sin(\omega_{c1}t))$$

$$= \cos(\omega_2 t)(Ae^{-j\omega_{c1}t} + jd\sin(\omega_{c1}t))$$

$$= \frac{A}{2}(e^{j(\omega_2 t - \omega_{c1}t)} + e^{-j(\omega_2 t + \omega_{c1}t)}) + \frac{d}{4}(e^{j(\omega_2 t + \omega_{c1}t)} - e^{-j(\omega_2 t - \omega_{c1}t)} + e^{-j(\omega_2 t - \omega_{c1}t)} + e^{-j(\omega_2 t + \omega_{c1}t)})$$

$$= \frac{1}{2}\left(A - \frac{d}{2}\right)(e^{j(\omega_2 t - \omega_{c1}t)} + e^{-j(\omega_2 t + \omega_{c1}t)}) + \frac{d}{4}(e^{-j(\omega_2 t - \omega_{c1}t)} + e^{j(\omega_2 t + \omega_{c1}t)})$$

In equation 1 and 2, a first term is an original output and a second term is an image signal.

Accordingly, since the output fu of the orthogonal detector 2 is a signal obtained by adding equation 1 to equation 2, a quasi-desired signal fd' obtained by adding the first term of equation 1 to the second term of equation 2 is shown in equation 3.

$$fd'(\omega t) = \frac{1}{2}\left(A - \frac{d}{2}\right)(e^{j(\omega_1 t - \omega_{c1}t)} + e^{-j(\omega_1 t + \omega_{c1}t)}) + \frac{d}{4}(e^{-j(\omega_2 t - \omega_{c1}t)} + e^{j(\omega_2 t + \omega_{c1}t)}) \quad \text{equation 3}$$

Further, a preparatory desired signal fu' obtained by adding the second term of equation 1 to the first term of equation 2 is shown in equation 4.

$$fu'(\omega t) = \frac{1}{2}\left(A - \frac{d}{2}\right)(e^{j(\omega_2 t - \omega_{c1}t)} + e^{-j(\omega_2 t + \omega_{c1}t)}) + \frac{d}{4}(e^{-j(\omega_1 t - \omega_{c1}t)} + e^{j(\omega_1 t + \omega_{c1}t)}) \quad \text{equation 4}$$

Figure 5:
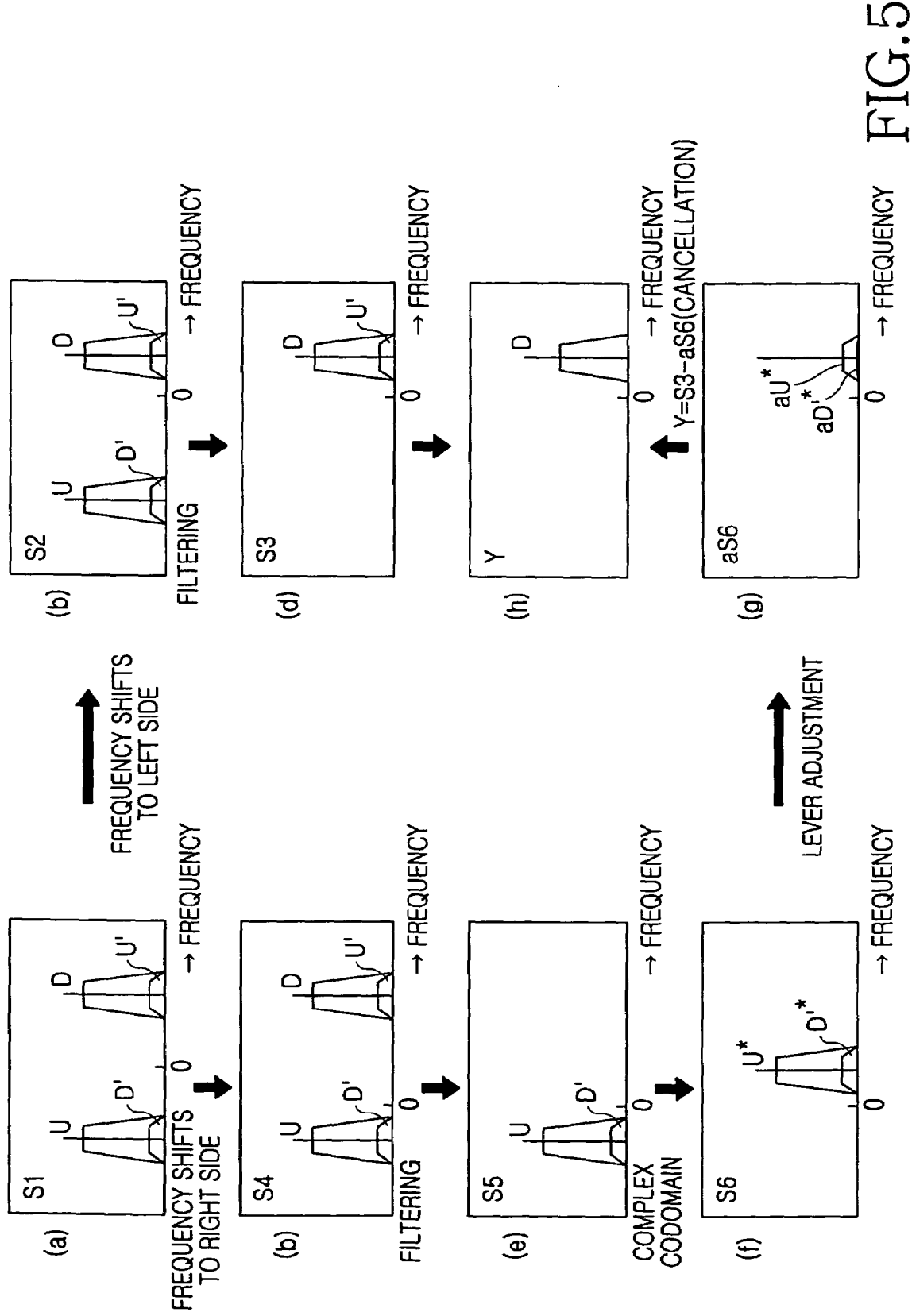
FIG. 5 is a view showing an image signal suppression operation performed by a receiver realized in radio equipment according to a first embodiment.

Further, an amplitude ratio of the desired signal existing in the quasi-desired signal fd' with respect to the image signal of the preparatory desired signal is shown in FIG. 5.

$$\frac{D}{U} = \frac{\frac{1}{2}\left(A - \frac{d}{2}\right)}{\frac{d}{4}} = \frac{2}{d}\left(A - \frac{d}{2}\right) = \frac{A+B}{A-B} \quad \text{equation 5}$$

In the conventional receiver, in order to delete the second term of the equation 3, a complex codomain signal of equation 4 is multiplied by a reciprocal of the equation 5, and then the result is subtracted from equation 3. However, since a frequency of a signal is high, the quasi-desired signal fd' and the preparatory desired signal fu' are respectively frequency-converted to signals close to a direct current component with a frequency of zero, and then the converted signals are processed in a receiver of an embodiment of the present invention.

Herein, when the frequency-converted amount is $\omega_{c2}$, a quasi-desired signal fd" shown in equation. 6 and a preparatory desired signal fu" shown in equation. 7 are respectively obtained from the quasi-desired signal fd' and the preparatory desired signal fu'.

$$fd''(\omega t) = \frac{1}{2}\left(A - \frac{d}{2}\right)(e^{j(\omega_1 t - \omega_{c1}t - \omega_{c2}t)} + e^{-j(\omega_1 t + \omega_{c1}t + \omega_{c2}t)}) + \frac{d}{4}(e^{-j(\omega_2 t - \omega_{c1}t + \omega_{c2}t)} + e^{j(\omega_2 t + \omega_{c1}t - \omega_{c2}t)}) \quad \text{equation 6}$$

$$fu''(\omega t) = \frac{1}{2}\left(A - \frac{d}{2}\right)(e^{j(\omega_2 t - \omega_{c1}t + \omega_{c2}t)} + e^{-j(\omega_2 t + \omega_{c1}t - \omega_{c2}t)}) + \frac{d}{4}(e^{-j(\omega_1 t - \omega_{c1}t - \omega_{c2}t)} + e^{j(\omega_1 t + \omega_{c1}t + \omega_{c2}t)}) \quad \text{equation 7}$$

Accordingly, in the receiver of an embodiment of the present invention, in order to delete the second term of the equation 6, a complex codomain signal of equation 7 is multiplied by the reciprocal of the equation 5, and then the result is subtracted from equation 6, thereby canceling the image signal of the undesired signal $\cos(\omega_{c2}t)$ existing in the quasi-desired signal.

$$f_{canceled}(\omega t) = fd''(\omega t) - \frac{d}{2\left(A - \frac{d}{2}\right)} fu''^*(\omega t) = fd''(\omega t) - \frac{d}{2\left(A - \frac{d}{2}\right)} \quad \text{equation 8}$$

$$\left(\frac{1}{2}\left(A - \frac{d}{2}\right)\right)(e^{-j(\omega_2 t - \omega_{c1}t + \omega_{c2}t)} + e^{j(\omega_2 t + \omega_{c1}t - \omega_{c2}t)}) +$$

$$\frac{d}{4}(e^{j(\omega_1 t - \omega_{c1}t - \omega_{c2}t)} + e^{-j(\omega_1 t + \omega_{c1}t + \omega_{c2}t)})) +$$

$$= \left(\frac{2A-d}{4} - \frac{d^2}{2(2A-d)}\right)(e^{j(\omega_1 t - \omega_{c1}t - \omega_{c2}t)} + e^{-j(\omega_1 t + \omega_{c1}t + \omega_{c2}t)}) +$$

$$\left(\frac{d}{4} - \frac{d}{4}\right)(e^{-j(\omega_2 t - \omega_{c1}t + \omega_{c2}t)} + e^{j(\omega_2 t + \omega_{c1}t - \omega_{c2}t)}))$$

-continued wherein, when $A \gg d$, $$f_{canceled}(\omega t) \approx \frac{A}{2}(e^{j(\omega_1 t - \omega_{c1} t - \omega_{c2} t)} + e^{-j(\omega_1 t + \omega_{c1} t + \omega_{c2} t)})$$

By means of a frequency converter 5, the frequency of the quasi-desired signal is frequency-converted (movement in a minus direction on a frequency axis) to a signal closer to a direct current component with a frequency of zero, and then a quasi-desired signal S2 is obtained. Likewise, the frequency of the preparatory desired signal is frequency-converted (movement in a plus direction on a frequency axis) to a signal closer to a direct current component with a frequency of zero, and then a preparatory desired signal S4 is obtained.

Next, the quasi-desired signal S2 and preparatory desired signal S4 frequency-converted to the signal closer to the direct current component having the frequency of zero are respectively filtered and down-sampled by means of a decimator 6.

Next, the down-sampled quasi-desired signal S3 and preparatory desired signal S5 are inputted to a characteristic compensator 7. The characteristic compensator 7 suppresses the image signal of the undesired signal included in the quasi-desired signal inputted from the decimator 6 by means of the complex codomain signal of the preparatory desired signal inputted from the decimator 6.

The output of the characteristic compensator 7 is demodulated by a detector 8, and then converted into data of a digital signal row.

Next, the orthogonal detector 2 is described. The orthogonal detector 2 includes an orthogonal carrier oscillator 1a for outputting a complex local signal of a first frequency same as a carrier frequency of a received signal received by an antenna 1, a multiplier 1b and 1c for respectively multiplying the real reception signal received through the antenna 1 by a real-axis signal "cos" of the local signal of the first frequency outputted from the orthogonal carrier oscillator 1a and an imaginary-axis signal "−sin" of which phase has moved by 90° in relation to the real-axis signal. Further, the received real reception signal is orthogonal-transformed by the orthogonal detector 2, and then the complex reception signal S1 is obtained.

Figure 2:
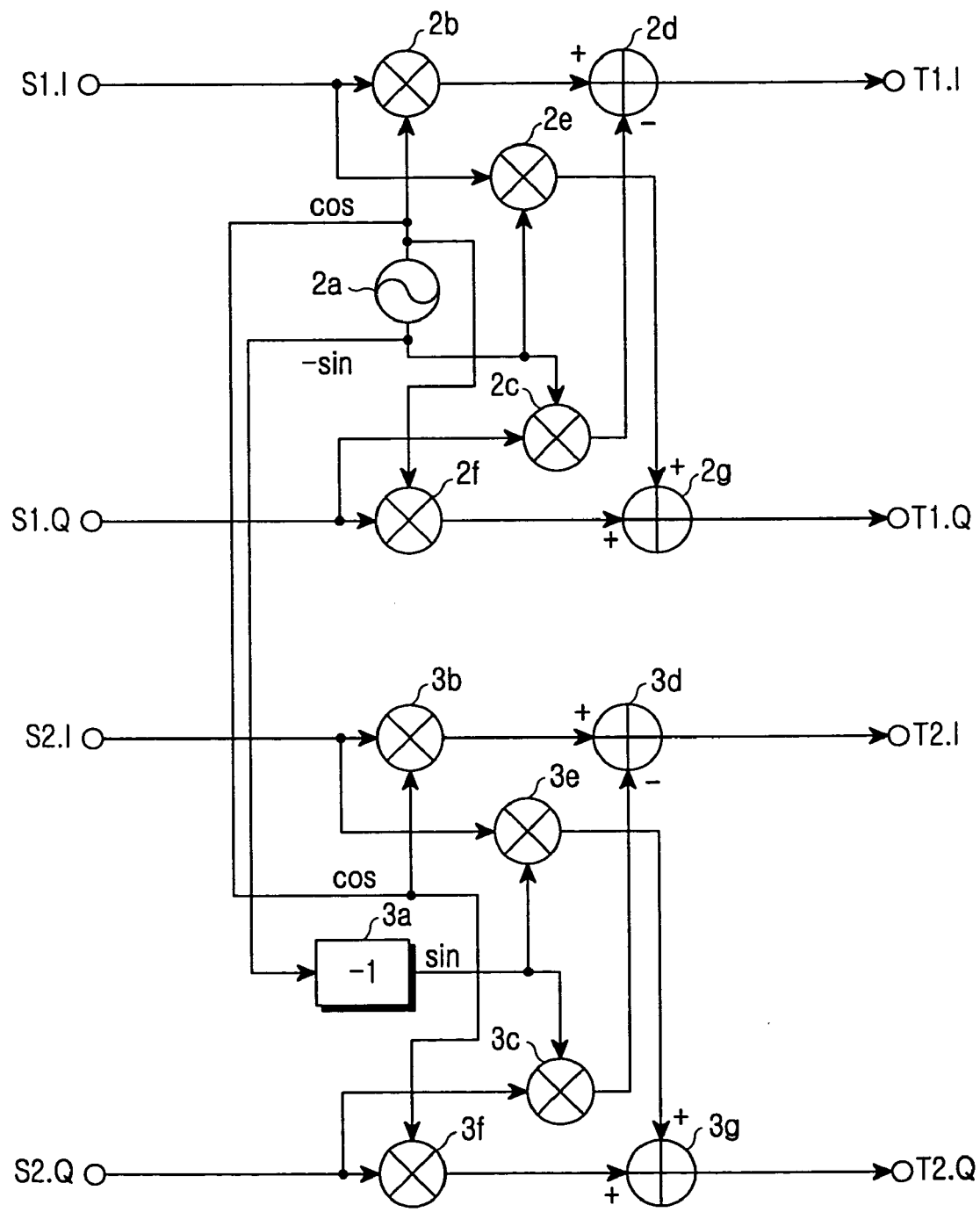
FIG. 2 is a block diagram showing a construction of a frequency converter used in a receiver realized in radio equipment according to a first embodiment.

Next, the frequency converter 5 is described. As shown in FIG. 2, in order to convert the frequency of the quasi-desired signal into a signal closer to a direct current component with a frequency of zero, the frequency converter 5 includes an orthogonal carrier oscillator 2a for outputting a complex local signal of a second frequency by a predetermined value lower than the frequency of the quasi-desired signal, a multiplier 2b for multiplying a real-axis signal S1.1 of the complex reception signal S1 inputted from a terminal S1.1 by a real-axis signal "cos" of the local signal of the second frequency outputted from the orthogonal carrier oscillator 2a, a multiplier 2c for multiplying an imaginary-axis signal S1.Q of the complex reception signal S1 inputted from a terminal S1.Q by an imaginary-axis signal "−sin" of which phase has moved by 90° in relation to the real-axis signal, and a subtracter 2d for subtracting the output of the multiplier 2c from the output of the multiplier 2b, and then employing the result as a signal output T1.1 of a real-axis signal.

Further, the frequency converter 5 includes a multiplier 2e for multiplying the real-axis signal S1.1 of the complex reception signal S1 inputted from the terminal S1.1 by the imaginary-axis signal "−sin" of the local signal of the second frequency outputted from the orthogonal carrier oscillator 2a, a multiplier 2f for multiplying the imaginary-axis signal S1.Q of the complex reception signal S1 inputted from the terminal S1.Q by the real-axis signal "cos" of the local signal of the second frequency outputted from the orthogonal carrier oscillator 2a, and an adder 2g for adding the output of the multiplier 2e to the output of the multiplier 2f, and then employing the result as an imaginary-axis signal output T1.Q.

Further, in order to convert the preparatory desired signal into a signal closer to a direct current component with a frequency of zero, the frequency converter 5 includes a sign inverter 3a for inverting a sign of the imaginary-axis signal outputted from the orthogonal carrier oscillator 2a, and then obtaining a complex codomain signal of a local signal of the second frequency, a multiplier 3b for multiplying the real-axis signal S2.1 of the complex reception signal S1 inputted from a terminal S2.1 by a real-axis signal "cos" of a local signal of a third frequency generated as the complex codomain signal of the local signal of the second frequency outputted from the orthogonal carrier oscillator 2a, a multiplier 3c for multiplying the imaginary-axis signal S2.Q of the complex reception signal S1 inputted from the terminal S2.Q by an imaginary-axis signal "−sin", of which phase has delayed by 90° in relation to the real-axis signal, of the local signal of the third frequency generated as the complex codomain signal of the local signal of the second frequency outputted from the orthogonal carrier oscillator 2a, and a subtracter 3d for subtracting the output of the multiplier 3c from the output of the multiplier 3b, and then employing the result as a real-axis signal output T2.1.

Further, the frequency converter 5 includes a multiplier 3e for multiplying the real-axis signal S2.1 of the complex reception signal S1 inputted from the terminal S2.1 by the imaginary-axis signal "−sin" of the local signal of the third frequency generated as the complex codomain signal of the local signal of the second frequency outputted from the orthogonal carrier oscillator 2a, a multiplier 3f for multiplying the imaginary-axis signal S1.Q of the complex reception signal S1 inputted from the terminal S1.Q by the real-axis signal "cos" of the local signal of the third frequency generated as the complex codomain signal of the local signal of the second frequency outputted from the orthogonal carrier oscillator 2a, and an adder 3g for adding the output of the multiplier 3e to the output of the multiplier 3f, and then employing the result as an imaginary-axis signal output T2.Q.

Further, in stead of the orthogonal carrier oscillator 2a, in order to convert the preparatory desired signal into a signal closer to a direct current component with a frequency of zero, an orthogonal carrier oscillator for outputting a complex local signal may be employed.

A complex codomain signal of a complex local signal outputted from a corresponding orthogonal carrier oscillator may be used as a complex local signal for frequency-converting the frequency of the quasi-desired signal into a signal closer to a direct current component with a frequency of zero.

Figure 3:
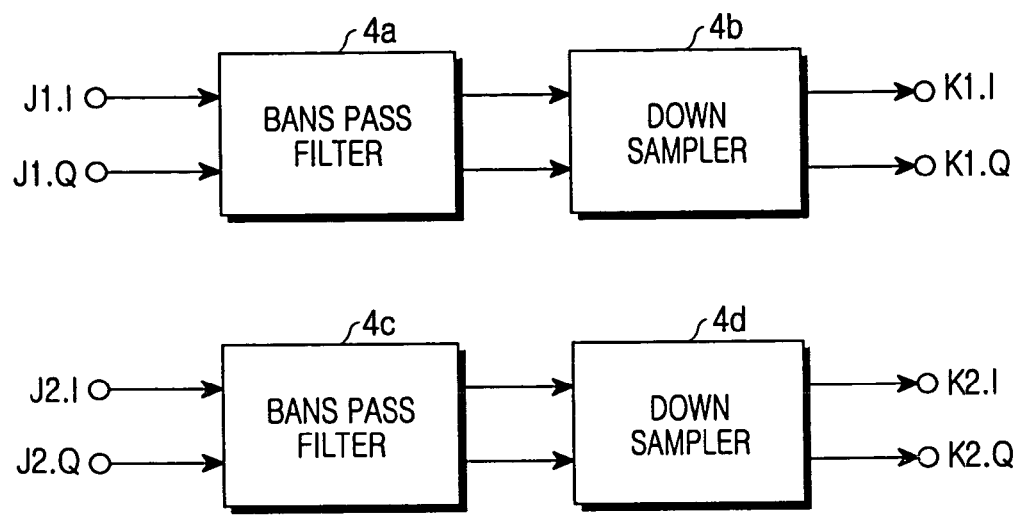
FIG. 3 is a block diagram showing a construction of a decimator used in a receiver realized in a radio equipment according to a first embodiment.

Next, the decimator 6 will be described hereinafter. As shown in FIG. 3, the decimator 6 includes a band pass filter 4a, which extracts the quasi-desired signal by utilizing a frequency band of the quasi-desired signal outputted from the frequency converter 5 as a pass band, and a down sampler 4b, which select data from an output signal of the band pass filter 4a. Therefore, the decimator 6 can separate a quasi-desired signal and a preparatory desired signal from each other, as well as removing signals of a frequency band in which an aliasing occurs, when a sampling frequency of signals inputted from terminals J1.1 and J1.Q is lowered.

Further, the decimator 6 has pass band characteristic symmetrical to the band pass filter 4a and direct current component with a frequency of zero, and includes a band pass filter 4c, which extracts the preparatory desired signal by utilizing a frequency band of the preparatory desired signal outputted from the frequency converter 5 as a pass band, and a down sampler 4d, which selects data from an output signal of the band pass filter 4c. Therefore, the decimator 6 can separate a quasi-desired signal and a preparatory desired signal from each other, as well as removing signals of a frequency band in which an aliasing occurs, when a sampling frequency of signals inputted from terminals J2.1 and J2.Q is lowered.

Further, in filter coefficients of the band pass filter 4a and band pass filter 4c, one side of the band pass filter 4a and band pass filter 4c inverts a sign of an imaginary-axis side of a complex filter coefficient prepared in other side of the band pass filter 4a and band pass filter 4c so that the band pass filter 4a and band pass filter 4c realize a band characteristic symmetrical to a direct current component with a frequency of zero.

Figure 4:
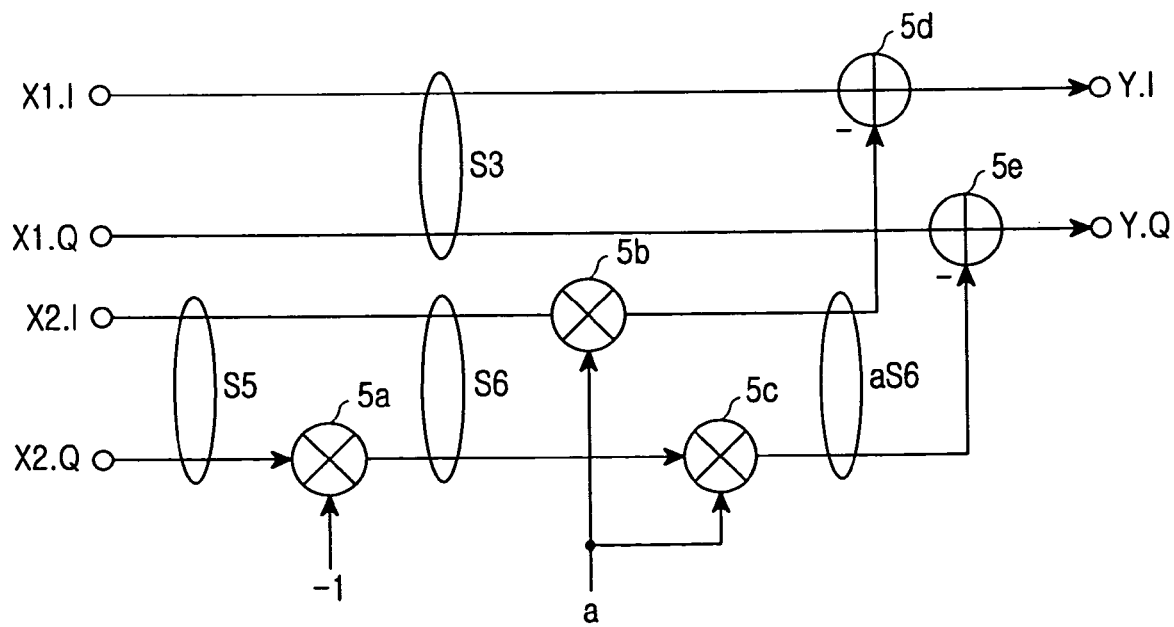
FIG. 4 is a block diagram showing a construction of a characteristic compensator used in a receiver realized in radio equipment according to a first embodiment.

Next, a characteristic compensator 7 is described. As shown in FIG. 4, the basic circuit of the characteristic compensator 7 includes a multiplier 5a for multiplying an imaginary-axis signal X2.Q of a preparatory desired signal inputted from terminals X2.1/X2.Q by "−1" and generating a complex codomain signal S6 of the preparatory desired signal S5, a multiplier 5b/5c for respectively multiplying a real-axis signal X2.1 and imaginary-axis signal −X2.Q of the generated complex codomain signal X2.1/−X2.Q by a coefficient "a" and obtaining an image frequency interference cancellation signal aS6, and a subtractor 5d/5e for subtracting the image frequency interference cancellation signal aS6 from a quasi-desired signal S3 inputted in terminals X1.1/X1.Q.

In the basic circuit of the characteristic compensator 7 utilized in the embodiment of the present invention, the value of the coefficient "a" may be adjusted so that the level of the quasi-desired signal can be minimized, or the value of the coefficient "a" may be adjusted so that the level of the preparatory desired signal can be minimized by means of a spectrum analyzer, etc., thereby obtaining the object of the present invention. As described above, the adjusting method is very simple in comparison to the conventional method requiring an adjustment of both a phase and an amplitude, and the object of the present invention can be obtained through the simple method. Further, when an inputted signal is intercepted and a calibration signal is inputted, the object of the present invention can be obtained through a simple method which can minimize a level of an output signal.

Further, in the above-described basic circuit, the multiplier 5a may be omitted by employing a coefficient which is inputted to the multiplier 5b as "a" and employing a coefficient which is inputted to the multiplier 5c as "−a".

Next, a suppression operation of an image signal performed by a receiver according to an embodiment of the present invention is described with reference to FIG. 5.

First, as shown in FIG. 5a, in an output of the orthogonal detector 2 in FIG. 1, the complex reception signal S1 exists as either a quasi-desired signal, which includes a desired signal D and an image signal U' of an undesired signal U integrated with each other, or a preparatory desired signal, which includes an undesired signal U and an image signal D' of desired signal D integrated with each other.

Next, as shown in FIG. 5b, a frequency of the desired signal D (quasi-desired signal) is frequency-converted to a signal closer to a direct current component with a frequency of zero by the frequency converter 5, and then the signal S2 is generated. The signal S2 is filtered by the band pass filter 4a in the decimator 6, that is, as shown in FIG. 5c, a return of a received signal repeating in each sampling frequency and the preparatory desired signal are simultaneously removed. Next, data is culled by the down sampler 4b in the decimator 6, and then the quasi-desired signal S3, which has a low sampling rate, including the image signal U' in the undesired signal U is extracted.

Likewise, as shown in FIG. 5d, a frequency of the undesired signal U (preparatory desired signal) is frequency-converted to a signal closer to a direct current component with a frequency of zero by the frequency converter 5, and then the signal S4 is generated. The signal S4 is filtered by the band pass filter 4c in the decimator 6, that is, as shown in FIG. 5e, a return of a received signal repeating in each sampling frequency and the quasi-desired signal are simultaneously removed. Next, data is culled by the down sampler 4d in the decimator 6, and then the preparatory desired signal S5, which has a low sampling rate, including the image signal D' in the desired signal D is extracted.

The extracted quasi-desired signal S3 and preparatory desired signal S5 are inputted to the characteristic compensator 7. In the characteristic compensator 7, a sign of an imaginary-axis signal in the preparatory desired signal S5 is inverted by the multiplier 5a, and then a complex codomain signal S6 is generated. Simultaneously, the level of the complex codomain signal S6 is adjusted by the multiplier 5b and 5c by means of the coefficient "a", thereby generating the image frequency interference cancellation signal aS6.

Further, when the image frequency interference cancellation signal aS6 is subtracted from the quasi-desired signal S3, since the image signal U' of the undesired signal U existing in the quasi-desired signal S3 is cancelled, the desired signal D can be extracted.

As described above, according to the receiver of the first embodiment, in the output of the orthogonal detector 2, when the image signal of the undesired signal existing in the quasi-desired signal is compensated for by means of a replica of the image signal in the undesired signal generated from the preparatory desired signal in the characteristic compensator 7, the quasi-desired signal and preparatory desired signal outputted from the orthogonal detector 2 are frequency-converted to a signal closer to a direct current component with a frequency of zero by the frequency converter 5, and then the converted signals converted into a signal with a low sampling rate by the decimator 6, thereby reducing the amount of operation in the characteristic compensator 7.

A Second Embodiment

A second embodiment of the present invention is described.

Figure 6:
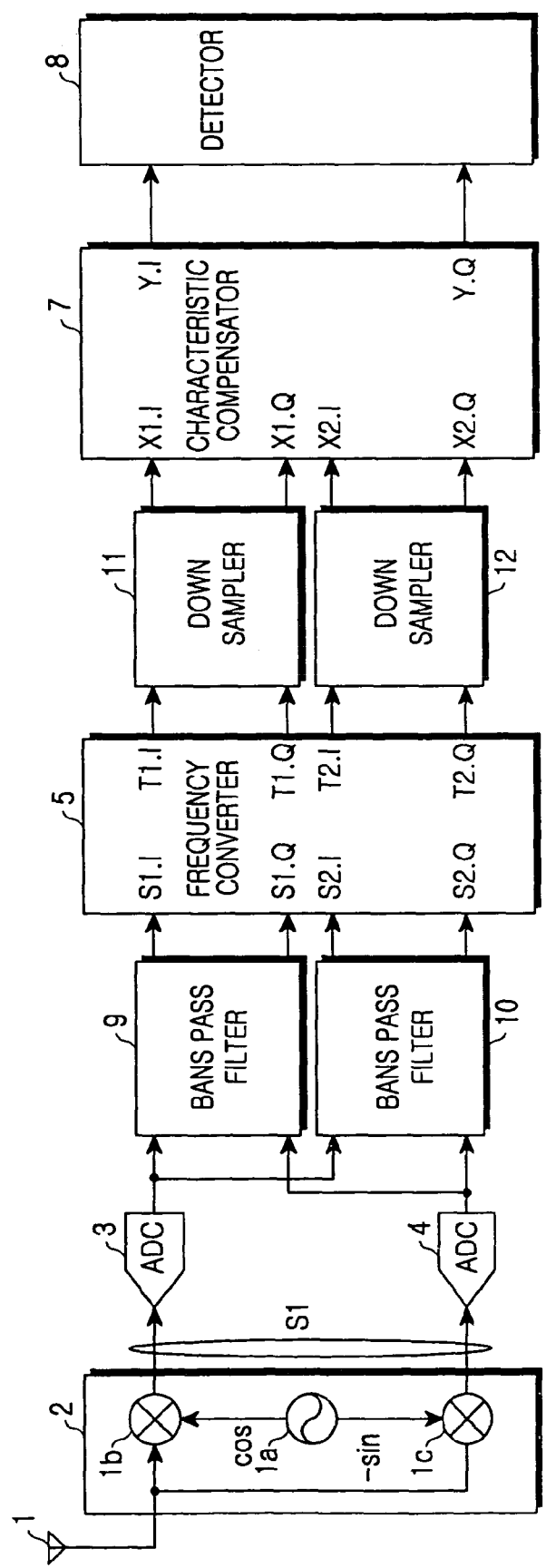
FIG. 6 is a block diagram showing a construction of a receiver realized in a radio equipment according to a second embodiment of the present invention.

FIG. 6 is a block diagram showing a construction of a receiver realized in a radio equipment according to a second embodiment of the present invention.

The receiver according to the second embodiment of the present invention has a characteristic in which a connection sequence between the frequency converter 5 and the band pass filters 4a/4c included in the frequency converter 5 and the decimator 6 in the receiver according to the above-described first embodiment has changed.

The receiver according to the second embodiment of the present invention is described with reference to FIG. 6. In the receiver, a signal is received through an antenna 1, and the received real signal is converted into a complex reception signal S1 of an intermediate frequency (IF frequency) by an orthogonal detector 2.

Next, when the received signal has been converted into the complex reception signal S1 of the intermediate frequency, a real-axis signal and an imaginary-axis signal of the complex reception signal S1 converted into the complex signal by an orthogonal detector 2 are respectively converted into digital signals by means of ADCs (A/D converters) 3 and 4 for quantizing an inputted signal with a predetermined sampling frequency according to a sampling theorem.

Next, in an output of the ADCs 3 and 4, in order to remove a return of a received signal repeating in each sampling frequency and separate a quasi-desired signal and a preparatory desired signal included in the output of the ADCs 3 and 4, the quasi-desired signal is extracted by a band pass filter 9 employing a frequency band of the quasi-desired signal outputted from the ADCs 3 and 4 as a pass band.

Likewise, in order to remove a return of a received signal repeating in each sampling frequency and separate a quasi-desired signal and a preparatory desired signal included in the output of the ADCs 3 and 4, the preparatory desired signal is extracted by a band pass filter 10, which has a pass band characteristic symmetrical to the band pass filter 9 and direct current component with a frequency of zero, employing a frequency band of the preparatory desired signal outputted from the ADCs 3 and 4 as a pass band.

Further, in filter coefficients of the the band pass filter 9 and band pass filter 10, one side of the band pass filter 9 and band pass filter 10 inverts a sign of an imaginary-axis side of a complex filter coefficient prepared in other side of the band pass filter 9 and band pass filter 10 so that the band pass filter 9 and band pass filter 10 can realize a band characteristic symmetrical to a direct current component with a frequency of zero.

When the quasi-desired signal and the preparatory desired signal can be separated from each other, the frequency of the quasi-desired signal is frequency-converted (movement in a minus direction on a frequency axis) to a signal closer to a direct current component with a frequency of zero by the frequency converter 5. Likewise, the frequency of the preparatory desired signal is frequency-converted (movement in a plus direction on a frequency axis) to a signal closer to a direct current component with a frequency of zero by the frequency converter 5.

The quasi-desired signal and preparatory desired signal outputted from the frequency converter 5 are each converted into signals with a low sampling rate by a down sampler 11, which converts a sampling rate of the quasi-desired signal outputted from the frequency converter 5 and employs the converted signal as a signal with a low sampling rate, and a down sampler 12, which converts a sampling rate of the preparatory desired signal outputted from the frequency converter 5 and employs the converted signal as a signal with a low sampling rate.

Next, the down-sampled quasi-desired signal and preparatory desired signal are inputted to a characteristic compensator 7. The characteristic compensator 7 suppresses an image signal of an undesired signal included in the quasi-desired signal inputted from the down sampler 11 by means of a complex codomain signal of the preparatory desired signal inputted from the down sampler 12.

The output of the characteristic compensator 7 is demodulated by a detector 8, and then converted into data of a digital signal row.

Since a detailed description for the orthogonal detector 2 and frequency converter 5 is the same as that of the first embodiment, the description is omitted.

As described above, according to the receiver of the second embodiment, in the output of the orthogonal detector 2, when the image signal of the undesired signal existing in the quasi-desired signal is compensated by means of a replica of the image signal in the undesired signal generated from the preparatory desired signal in the characteristic compensator 7, the quasi-desired signal and preparatory desired signal outputted from the orthogonal detector 2 are respectively separated into a quasi-desired signal and a preparatory desired signal, and the separated signals are frequency-converted to signals more close to a direct current component with a frequency of zero by the frequency converter 5, and then the converted signals converted into a signal with a low sampling rate by the down sampler 11 and 12, thereby reducing the amount of operation in the characteristic compensator 7.

A Third Embodiment

A third embodiment of the present invention is described.

In a receiver realized in a radio equipment according to the third embodiment of the present invention, a quasi-desired signal and a preparatory desired signal can be separated by a filter for suppressing an unnecessary frequency component through a phase process utilizing the Hilbert transform, in stead of the decimator 6 in the receiver of the above-described first embodiment.

Figure 7:
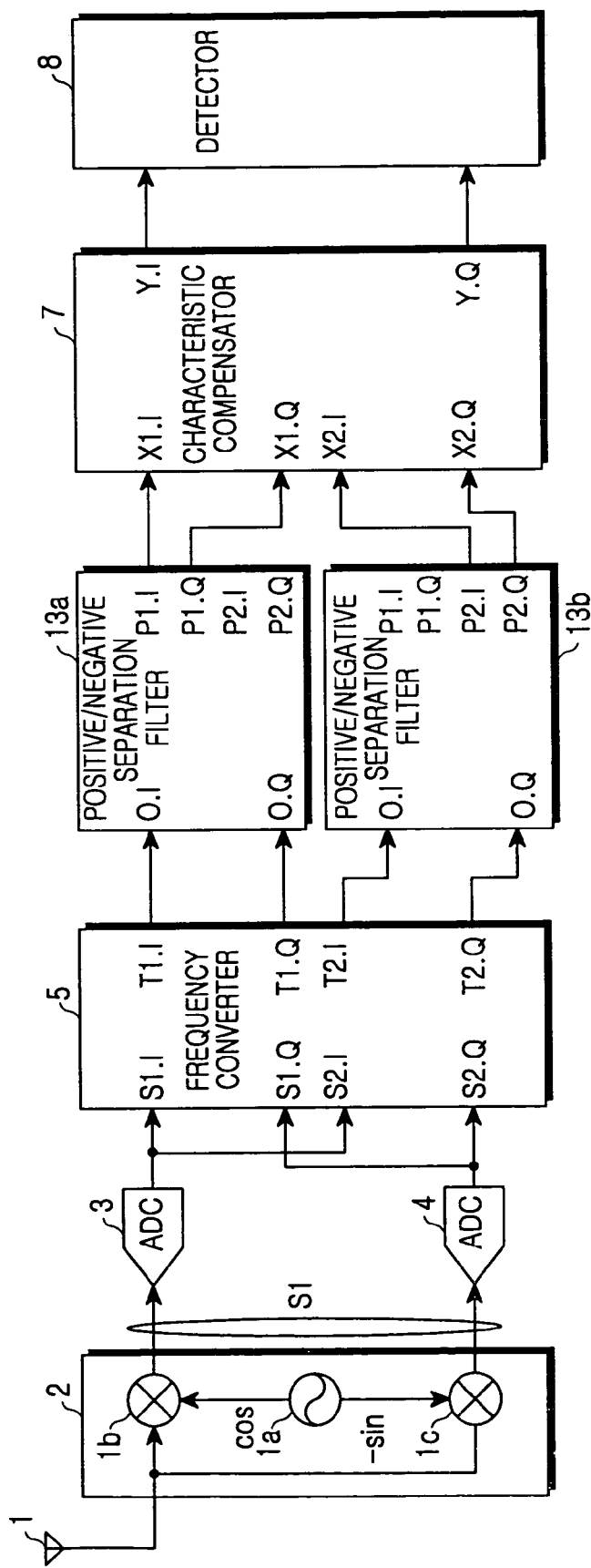
FIG. 7 is a block diagram showing a construction of a receiver realized in a radio equipment according to a third embodiment of the present invention.

The receiver according to the third embodiment of the present invention is described with reference to FIG. 7. In the receiver, a signal is received through an antenna 1, and the received real signal is converted into a complex reception signal S1 of an intermediate frequency (IF frequency) by an orthogonal detector 2.

Next, when the received signal has been converted into the complex reception signal S1 of the intermediate frequency, a real-axis signal and an imaginary-axis signal of the complex reception signal S1 converted into the complex signal by an orthogonal detector 2 are respectively converted into digital signals by means of ADCs (A/D converters) 3 and 4 for quantizing an inputted signal with a predetermined sampling frequency according to a sampling theorem.

Next, by means of the frequency converter 5, the frequency of the quasi-desired signal is frequency-converted (movement in a minus direction on a frequency axis) to a signal closer to a direct current component with a frequency of zero, and likewise, the frequency of the preparatory desired signal is frequency-converted (movement in a plus direction on a frequency axis) to a signal closer to a direct current component with a frequency of zero.

Since two positive/negative separation filters, which suppress an unnecessary frequency component through a phase process utilizing the Hilbert transform, separate an inputted signal into two outputs with a pass band characteristic symmetrical to a direct current component with a frequency of zero, and then output the two outputs, are utilized, a frequency band of the quasi-desired signal and a frequency band of the preparatory desired signal are separated from an output of the frequency converter 5 and then the separated bands are extracted. In more detail, the quasi-desired signal is extracted to terminals P1.1 and P1.Q of the positive/negative separation filter 13a connected to terminals T1.1 and T1.Q of the frequency converter 5. Then, the preparatory desired signal is extracted to terminals P2.1 and P2.Q of the positive/negative separation filter 13b connected to terminals T2.1 and T2.Q of the frequency converter 5.

Next, the extracted quasi-desired signal and preparatory desired signal are inputted to a characteristic compensator 7. The characteristic compensator 7 suppresses an image signal of an undesired signal included in the inputted quasi-desired signal by means of a complex codomain signal of the preparatory desired signal inputted in same way.

The output of the characteristic compensator 7 is demodulated by a detector 8, and then converted into data of a digital signal row.

Since a detailed description for the orthogonal detector 2 and frequency converter 5 is the same as that of the first embodiment, the description is omitted.

The positive/negative separation filter 13a and 13b are described.

Figure 8:
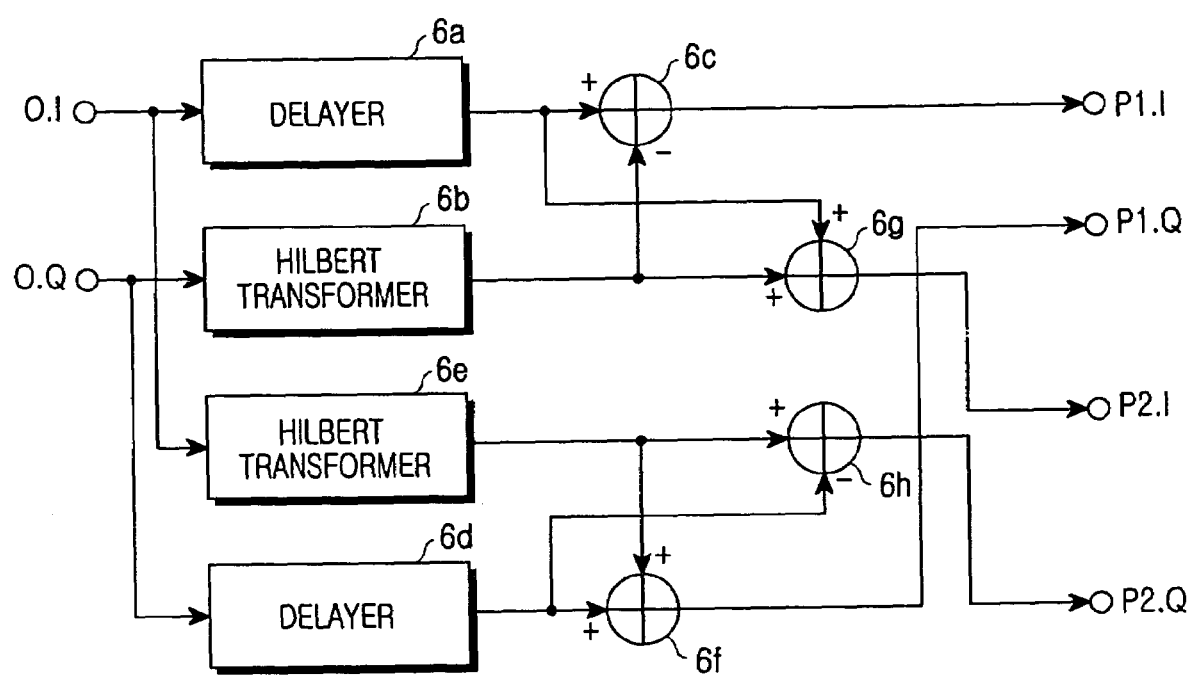
FIG. 8 is a block diagram showing a construction of a positive/negative separation filter used in a receiver realized in radio equipment according to a third embodiment.

As shown in FIG. 8, the positive/negative separation filter 13a and 13b respectively includes Hilbert transformers 6b and 6e, and delayers 6a and 6d for compensating for delay amount of the Hilbert transformers 6b and 6e.

A signal after Hilbert-transforming an imaginary-axis signal O.Q inputted from terminals O.1 and O.Q is subtracted from a delayed signal of a real-axis signal O.1 inputted from terminals O.1 and O.Q by a subtractor 6c, and the signal obtained from the subtraction result is employed as a real-axis signal P1.1 of a positive frequency component of a band pass characteristic symmetrical to a direct current component with a frequency of zero. A signal after Hilbert-transforming a real-axis signal O.1 is added to a delayed signal of the imaginary-axis signal O.Q by an adder 6f, and the signal obtained from the added result is outputted to terminals P1.1 and P1.Q as an imaginary-axis signal P1.Q of a positive frequency component of a band pass characteristic symmetrical to a direct current component with a frequency of zero.

Further, a signal after Hilbert-transforming the imaginary-axis signal O.Q is added to the delayed signal of the real-axis signal O.1 inputted from terminals O.1 and O.Q by an adder 6g, and the signal obtained from the added result is employed as a real-axis signal P2.1 of a negative frequency component of a band pass characteristic symmetrical to a direct current component with a frequency of zero. The delayed signal of the imaginary-axis signal O.Q is subtracted from the signal after Hilbert-transforming the real-axis signal O.1 by a subtractor 6h, and the signal obtained from the subtraction result is outputted to terminals P2.1 and P2.Q as an imaginary-axis signal P2.Q of a positive frequency component of a band pass characteristic symmetrical to a direct current component with a frequency of zero.

Not only a FIR filter but also an IIR filter may be utilized as the Hilbert transformers 6b and 6e, thereby realizing good characteristic even with small amount of operation.

As described above, according to the receiver of the third embodiment, in the output of the orthogonal detector 2, when the image signal of the undesired signal existing in the quasi-desired signal is compensated by means of a replica of the image signal in the undesired signal generated from the preparatory desired signal in the characteristic compensator 7, the quasi-desired signal and preparatory desired signal outputted from the orthogonal detector 2 are respectively frequency-converted to signals more close to a direct current component with a frequency of zero by the frequency converter 5, the converted signals are separated into a quasi-desired signal and a preparatory desired signal by means of the positive/negative separation filter 13a and 13b for suppressing an unnecessary frequency component through a phase process utilizing the Hilbert transform, and the a quasi-desired signal and the preparatory desired signal are certainly separated and inputted to the characteristic compensator 7, thereby excellently compensating for an orthogonal error.

A Fourth Embodiment

A fourth embodiment of the present invention is described.

In a receiver realized in a radio equipment according to the fourth embodiment of the present invention, a quasi-desired signal and a preparatory desired signal can be separated by a filter for suppressing an unnecessary frequency component through a phase process utilizing the Hilbert transform, in stead of the band pass filter 9 and 10 in the receiver of the above-described second embodiment.

Figure 9:
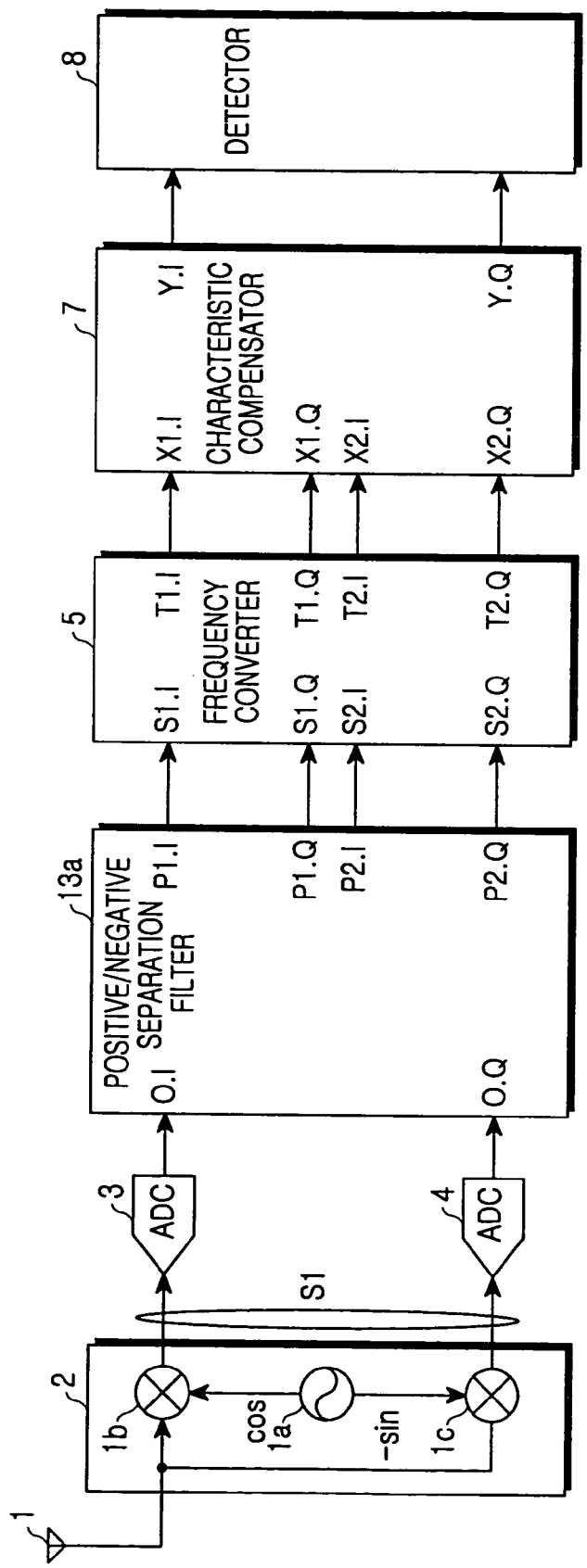
FIG. 9 is a block diagram showing a construction of a receiver realized in a radio equipment according to a fourth embodiment of the present invention.

The receiver according to the third embodiment of the present invention is described with reference to FIG. 9. In the receiver, a signal is received through an antenna 1, and the received real signal is converted into a complex reception signal S1 of an intermediate frequency (IF frequency) by an orthogonal detector 2.

Next, when the received signal has been converted into the complex reception signal S1 of the intermediate frequency, a real-axis signal and an imaginary-axis signal of the complex reception signal S1 converted into the complex signal by an orthogonal detector 2 are respectively converted into digital signals by means of ADCs (A/D converters) 3 and 4 for quantizing an inputted signal with a predetermined sampling frequency according to a sampling theorem.

Next, by means of a positive/negative separation filter 13a, which suppresses an unnecessary frequency component through a phase process utilizing the Hilbert transform, separates an inputted signal into two outputs with a pass band characteristic symmetrical to a direct current component with a frequency of zero, and then outputs the two outputs, a frequency band of the quasi-desired signal and a frequency band of the preparatory desired signal are separated in an ADCs 3 and 4.

When a quasi-desired signal and a preparatory desired signal can be separated from each other, the frequency of the quasi-desired signal is frequency-converted (movement in a minus direction on a frequency axis) to a signal closer to a direct current component with a frequency of zero by the frequency converter 5. Likewise, the frequency of the preparatory desired signal is frequency-converted (movement in a plus direction on a frequency axis) to a signal closer to a direct current component with a frequency of zero by the frequency converter 5.

Next, the frequency-converted quasi-desired signal and preparatory desired signal are inputted to a characteristic compensator 7. The characteristic compensator 7 suppresses an image signal of an undesired signal included in the quasi-desired signal inputted from the frequency converter 5 by means of a complex codomain signal of the preparatory desired signal inputted from the frequency converter 5.

The output of the characteristic compensator 7 is demodulated by a detector 8, and then converted into data of a digital signal row.

Since a detailed description for the orthogonal detector 2 and frequency converter 5 is the same as that of the first embodiment, the description is omitted. Further, a detailed description for the positive/negative separation filter 13a is the same as that of the positive/negative separation filter 13a or positive/negative separation filter 13b described in the third embodiment, the description is omitted.

As described above, according to the receiver of the fourth embodiment, in the output of the orthogonal detector 2, when the image signal of the undesired signal existing in the quasi-desired signal is compensated for by means of a replica of the image signal in the undesired signal generated from the preparatory desired signal in the characteristic compensator 7, the quasi-desired signal and preparatory desired signal outputted from the orthogonal detector 2 are respectively separated into a quasi-desired signal and a preparatory desired signal by means of the positive/negative separation filter 13a for suppressing an unnecessary frequency component through a phase process utilizing the Hilbert transform, the separated signals are respectively frequency-converted to signals more close to a direct current component with a frequency of zero by the frequency converter 5, and the a quasi-desired signal and the preparatory desired signal are certainly separated with a small size of circuit and inputted to the characteristic compensator 7, thereby excellently compensating for an orthogonal error.

A Fifth Embodiment

A fifth embodiment of the present invention is described.

A receiver realized in a radio equipment according to the fifth embodiment of the present invention has a characteristic in which a characteristic compensator with two complex signal inputs and one complex signal output can be included, instead of the characteristic compensator 7 with two complex signal inputs and one complex signal output in the receiver of the above-described first embodiment.

Figure 10:
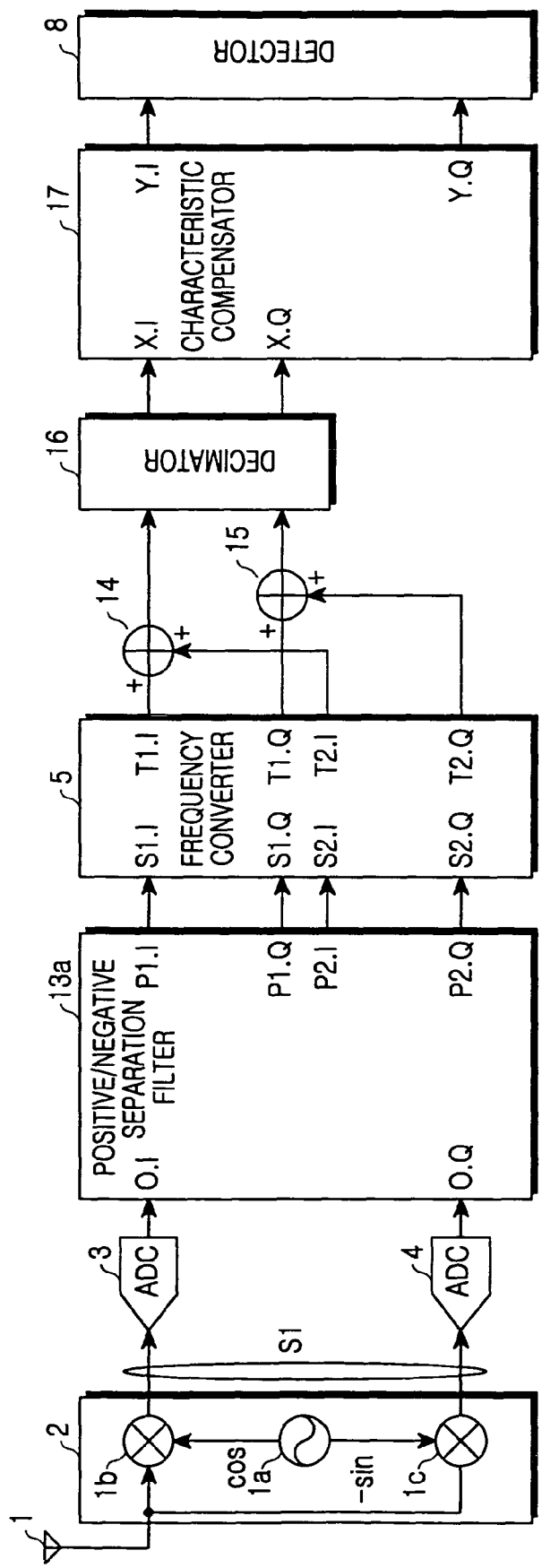
FIG. 10 is a block diagram showing a construction of a receiver realized in a radio equipment according to a fifth embodiment of the present invention.

The receiver according to the third embodiment of the present invention is described with reference to FIG. 10. In the receiver, a signal is received through an antenna 1, and the received real signal is converted into a complex reception signal S1 of an intermediate frequency (IF frequency) by an orthogonal detector 2.

Next, when the received signal has been converted into the complex reception signal S1 of the intermediate frequency, a real-axis signal and an imaginary-axis signal of the complex reception signal S1 converted into the complex signal by an orthogonal detector 2 are respectively converted into digital signals by means of ADCs (A/D converters) 3 and 4 for quantizing an inputted signal with a predetermined sampling frequency according to a sampling theorem.

Next, by means of a positive/negative separation filter 13a, which suppresses an unnecessary frequency component through a phase process utilizing the Hilbert transform, separates an inputted signal into two outputs with a pass band characteristic symmetrical to a direct current component with a frequency of zero, and then outputs the two outputs, a frequency band of the quasi-desired signal and a frequency band of the preparatory desired signal are separated in an ADCs 3 and 4.

When a quasi-desired signal and a preparatory desired signal can be separated from each other, the frequency of the quasi-desired signal is frequency-converted (movement in a minus direction on a frequency axis) to a signal closer to a direct current component with a frequency of zero by the frequency converter 5. Likewise, the frequency of the preparatory desired signal is frequency-converted (movement in a plus direction on a frequency axis) to a signal closer to a direct current component with a frequency of zero by the frequency converter 5.

Next, a real-axis signal of the frequency-converted quasi-desired signal is added to and synthesized with a real-axis signal of preparatory desired signal by an adder 14, and an imaginary-axis signal of the frequency-converted quasi-desired signal is added to and synthesized with an imaginary-axis signal of preparatory desired signal by an adder 15.

Further, the synthesized signal is inputted to a decimator 16, and then a filtering and a down-sampling are performed.

Next, the down-sampled synthesis signal is inputted to a characteristic compensator 17, and the characteristic compensator 17 compensates for an orthogonal error and an amplitude error.

The output of the characteristic compensator 17 is demodulated by a detector 8, and then converted into data of a digital signal row.

Figure 11:
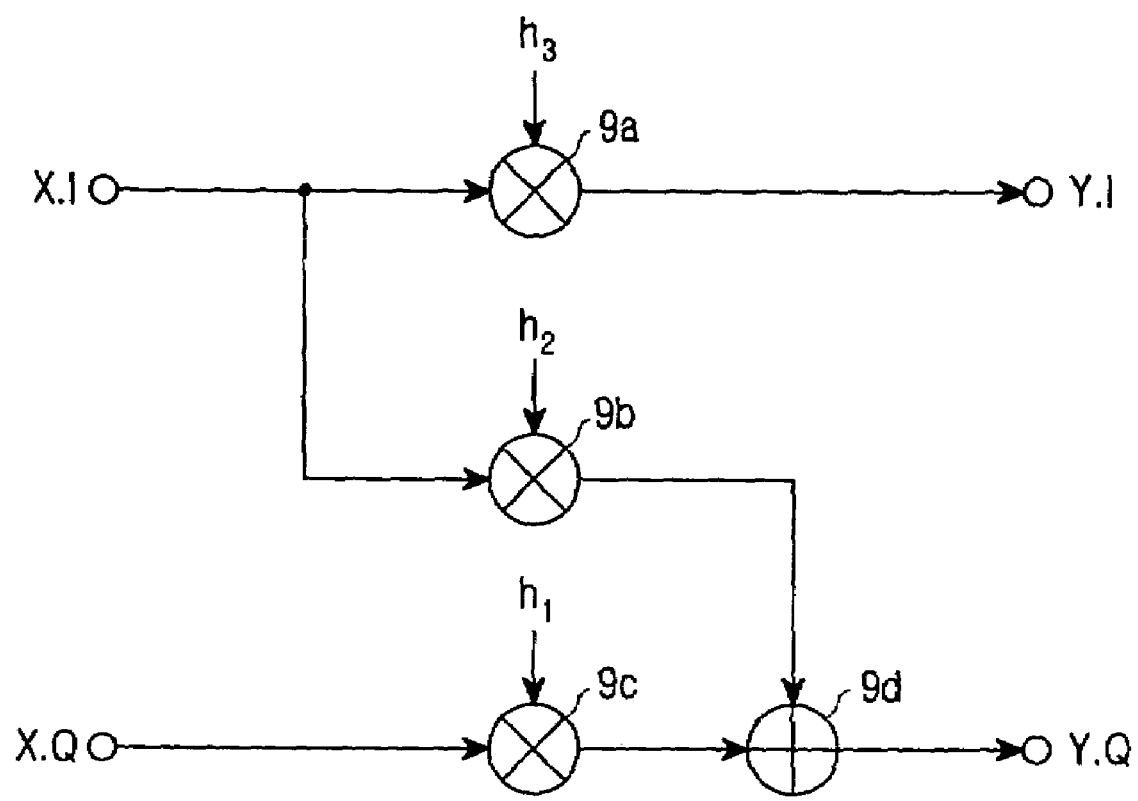
FIG. 11 is a block diagram showing a construction of a characteristic compensator used in a receiver realized in radio equipment according to a fifth embodiment.

The characteristic compensator 17 is described. FIG. 11 is an example of a case in which the characteristic compensator 17 is realized by means of an adaptive signal processing. With respect to a real-axis signal X.1 and an imaginary-axis signal X.Q inputted from terminals X.1 and X.Q, the real axis signal Y.1 and the imaginary-axis signal Y.Q, in which an orthogonal error and an amplitude error have been compensated for, are obtained through equations, $(Y.1) = h_3 \times (X.1)$ $(Y.Q) = h_1 \times (X.Q) + h_2 \times (X.1)$ in which h1, h2, h3 are responsively renewed by update equations of a coefficient, $h_{1,k} = h_{1,k-1} + \mu \times (Y.Q) \times (X.Q) \times e$ $h_{2,k} = h_{2,k-1} + \mu \times (Y.1) \times (X.Q) \times e$ $h_{3,k} = h_{3,k-1} + \mu \times (Y.1) \times (X.1) \times e$ (herein, σ represents a desired signal amplitude value and $e = \sigma^2 - ((Y.1)^2 + (Y.Q)^2)$).

Further, a multiplier 9a multiplies a real-axis signal X.1 inputted from terminals X.1 and X.Q by a coefficient $h_3$, and employs the signal obtained from the multiplication result as a real-axis signal Y.1 inputted from terminals Y.1 and Y.Q. A multiplier 9b multiplies a real-axis signal X.1 inputted from terminals X.1 and X.Q by a coefficient $h_2$, and a multiplier 9c multiplies an imaginary-axis signal X.Q inputted from terminals X.1 and X.Q by a coefficient $h_1$. Further, the output of the multiplier 9b is added to the output of the multiplier 9c, the signal obtained from the added result is employed as an imaginary-axis signal Y.Q inputted from terminals Y.1 and Y.Q.

Since a detailed description for the orthogonal detector 2, the frequency converter 5 and the positive/negative separation filter 13a is the same as that of the fourth embodiment, the description is omitted. Further, in order to remove a return of a quasi-desired signal or preparatory desired signal, the decimator 16 employs a frequency band of a signal synthesized by adders 14 and 15 as a pass band, and includes a low pass filter of a real coefficient for extracting the signal, and a down sampler for converting a sampling rate of an output signal in the low pass filter and employing the converted signal as a signal with a low sampling rate. Herein, the low pass filter and the down sampler are provided for a real-axis signal processing as well as an imaginary-axis signal processing.

Further, the decimator 16 performs a filtering and a down sampling on each real-axis signal and each imaginary-axis signal of the synthesized signal.

As described above, according to the receiver of the fourth embodiment, the quasi-desired signal and preparatory desired signal outputted from the orthogonal detector 2 are respectively frequency-converted to signals more close to a direct current component with a frequency of zero by the frequency converter 5, the converted signals are converted into signals with a low sampling rate by the decimator 16, thereby reducing the amount of operation in the characteristic compensator. Further, the characteristic compensator 15 with a simple construction is utilized as a characteristic compensator, thereby excellently compensating for an orthogonal error with the small amount of operation and small size of circuit.

A Sixth Embodiment

A sixth embodiment of the present invention is described.

A receiver realized in a radio equipment according to the sixth embodiment of the present invention has a characteristic in which a circuit can be simplified by using in common the multipliers included in the frequency converter 5 described with reference to FIG. 2 in the receiver of the above-described first embodiment.

Figure 12:
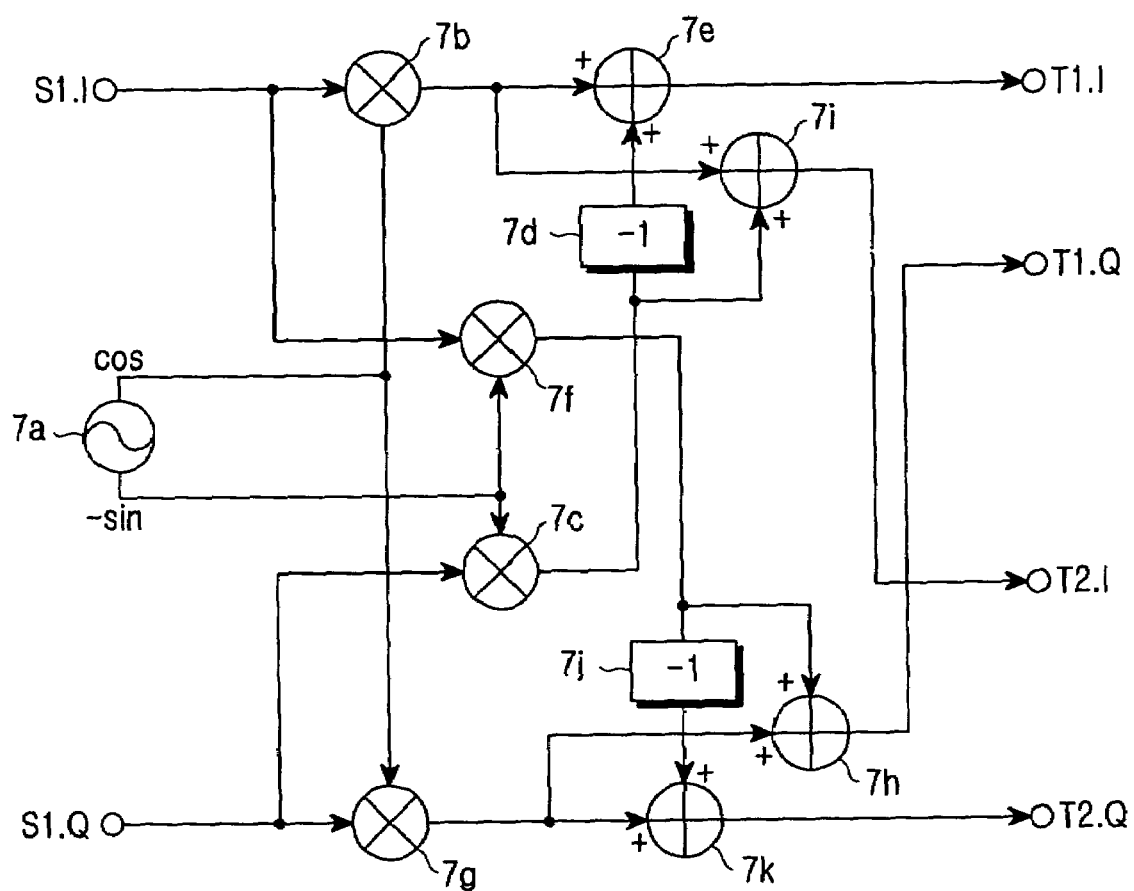
FIG. 12 is a block diagram showing a construction of a frequency converter used in a receiver realized in radio equipment according to a sixth embodiment of the present invention.

A synthesis complex mixer used as the frequency converter 5 in a receiver according to an embodiment of the present invention is described with reference to FIG. 12. FIG. 12 is a block diagram showing a construction of the synthesis complex mixer for use in common multipliers of a complex mixer, which includes a multiplier 2b, a multiplier 2c, a multiplier 2e and a multiplier 2f, and a complex mixer, which includes a multiplier 3b, a multiplier 3c, a multiplier 3e and a multiplier 3f, in the frequency converter 5 described with reference to FIG. 2 in the first embodiment. The synthesis complex mixer includes a multiplier 7b for multiplying a real-axis signal S1.1 of a complex reception signal S1 inputted from terminals S.1 and S.Q by a real-axis signal "cos" of a local signal in a second frequency generated from an orthogonal carrier oscillator 7a, and a multiplier 7c for multiplying an imaginary-axis signal S1.Q of a complex reception signal S1 inputted from terminals S.1 and S.Q by an imaginary-axis signal "−sin", of which phase has moved by 90° in relation to the real-axis signal, of a local signal in a second frequency generated from an orthogonal carrier oscillator 7a. In the synthesis complex mixer, an output sign of the multiplier 7c is inverted by a sign inverter 7d. Simultaneously, the inverted output is added to an output of the multiplier 7b by means of an adder 7e and employed as a real-axis signal output T1.1 of the two real-axis signal outputs.

The synthesis complex mixer includes a multiplier 7f for multiplying a real-axis signal S1.1 of a complex reception signal S1 inputted from terminals S.1 and S.Q by the imaginary-axis signal "−sin" of a local signal in a second frequency generated from an orthogonal carrier oscillator 7a connected to an outside, and a multiplier 7g for multiplying an imaginary-axis signal S1.Q of a complex reception signal S1 inputted from terminals S.1 and S.Q by the real-axis signal "cos" of a local signal in a second frequency generated from an orthogonal carrier oscillator 7a. In the synthesis complex mixer, the output of the multiplier 7g is added to an output of the multiplier 7f by means of an adder 7e and employed as an imaginary-axis signal output T1.Q of the two imaginary-axis signal outputs.

In the synthesis complex mixer, the output of the multiplier 7c is added to an output of the multiplier 7b by means of an adder 7i, and the output obtained from the added result is employed as a real-axis signal output T2.1 in two real-axis signal outputs. An output sign of the multiplier 7f is inverted by a sign inverter 7j. Simultaneously, the inverted output is added to an output of the multiplier 7g by means of an adder 7k, and the output obtained from the added result is employed as an imaginary-axis signal output T2.Q in two imaginary-axis signal outputs.

Since elements excepting for the inside construction of the frequency converter 5 are the same as those of the above-described first embodiment, a description for the elements excepting for the frequency converter 5 is omitted.

As described above, according to the receiver of the sixth embodiment, in the output of the orthogonal detector 2, when the image signal of the undesired signal existing in the quasi-desired signal is compensated by means of a replica of the image signal in the undesired signal generated from the preparatory desired signal in the characteristic compensator 7, only four multipliers are utilized after using the eight multipliers in the frequency converter 5 used in the first embodiment in common, the a quasi-desired signal and the preparatory desired signal are separated with a small size of circuit and inputted to the characteristic compensator 7, thereby excellently compensating for an orthogonal error.

Even in the above-described third embodiment, the synthesis complex mixer described with reference to FIG. 12 in the sixth embodiment may be utilized. Accordingly, like the sixth embodiment, the a quasi-desired signal and the preparatory desired signal can be separated with a small size of circuit can be inputted to the characteristic compensator 7, thereby excellently compensating for an orthogonal error.

A Seventh Embodiment

A seventh embodiment of the present invention is described.

A receiver realized in a radio equipment according to the seventh embodiment of the present invention has a characteristic in which an adaptation process is introduced in the characteristic compensator 7 described with reference to FIG. 4 in the receiver of the above-described first embodiment.

Figure 13:
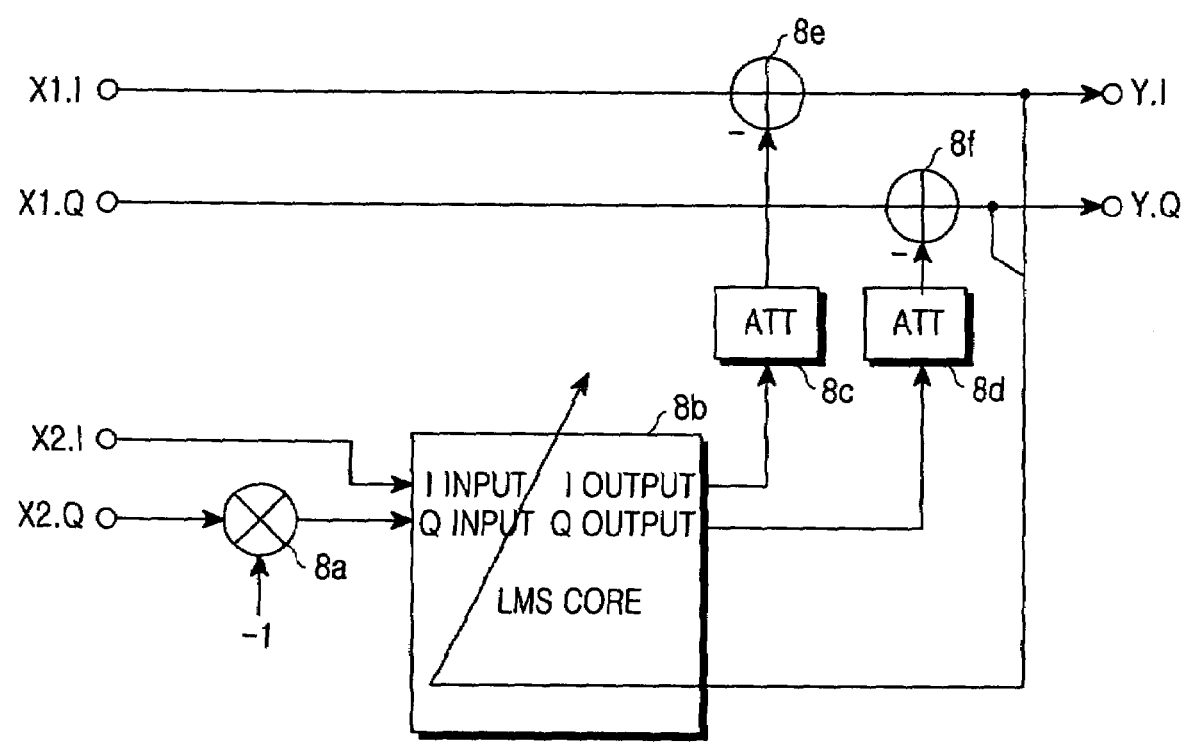
FIG. 13 is a block diagram showing a construction of a characteristic compensator used in a receiver realized in radio equipment according to a seventh embodiment of the present invention.

A characteristic compensator, which has introduced the adaptation process, utilized as the characteristic compensator 7 in the receiver according to the seventh embodiment is described with reference to FIG. 13. FIG. 13 is a block diagram showing a construction of the characteristic compensator 7, which has introduced the adaptation process, described with reference to FIG. 4 in the first embodiment. The characteristic compensator, which has introduced the adaptation process, includes a multiplier 8a for multiplying an imaginary-axis signal X2.Q of a preparatory desired signal inputted from terminals X2.1 and X2.Q by "−1" and generating a complex codomain signal of the inputted preparatory desired signal by inverting the sign of the imaginary-axis signal X2.Q, and a LMS core 8b, which is a central pate of an adaptation filter, for controlling a filter coefficient after employing output signals Y.1 and Y.Q of the characteristic compensator 7 as error signals, and employing the generated complex codomain signal as a reference signal.

The characteristic compensator, which has introduced the adaptation process, includes an ATT 8c (signal attenuator) of a real-axis side for adjusting a signal level of an output (image frequency interference cancellation signal) of the LMS core 8b, an ATT 8d (signal attenuator) of an imaginary-axis side for adjusting a signal level of an output (image frequency interference cancellation signal) of the LMS core 8b, a subtractor 8e of a real-axis side for synthesizing the image frequency interference cancellation signal adjusted by the ATT 8c to a quasi-desired signal inputted from a terminal X1.1, and a subtractor 8f of an imaginary-axis side for synthesizing the image frequency interference cancellation signal adjusted by the ATT 8d to a quasi-desired signal inputted from a terminal X1.Q.

The LMS core 8b employs the complex codomain signal generated from the preparatory desired signal inputted to the terminals X2.1 and X2.Q as a reference signal S. The LMS core 8b operates so that an error between the reference signal S and an image signal of undesired signal, which has generated from the orthogonal detector 2 existing in a quasi-desired signal inputted to the terminals X1.1 and X1.Q, can be minimized. When there is no error, since the image signal of undesired signal is completely suppressed, a suppression characteristic of the image signal can be improved up to an adaptation accuracy limitation of the characteristic compensator 7.

When the adaptation process is performed, a calibration signal may be inputted to the characteristic compensator 7, and then a coefficient of the adaptation filter may be obtained.

The ATT 8c of the real-axis side for adjusting a signal level of an output of the LMS core 8b and the ATT 8d of the imaginary-axis side for adjusting a signal level of an output of the LMS core 8b are inserted so that a filter coefficient word length of the LMS core 8b can be operated at a minimum coefficient word length. This insertion is performed because the image signal of undesired signal has a very low signal level in comparison to the complex codomain signal, which is inputted to the adaptation filter as the reference signal, generated from the preparatory desired signal inputted to the terminals X2.1 and X2.Q. When the attenuator is not used, the LMS core 8b varies a signal level of an image frequency interference cancellation signal, which is an output, to a signal level of the image signal of undesired signal by varying the size of the coefficient value. However, when the coefficient value must be small, the variation operation causes an adaptation accuracy to lower as the filter coefficient word length is shortened. Accordingly, the variation operation is not preferable.

Since a characteristic variation of an analog section does not occur in a short time, it is not always necessary to perform the adaptation process when the image signal of undesired signal slowly varies on the time-axis. Accordingly, except for a necessary case, signals can be processed when an adaptation operation of the adaptation filter is stopped. Specially, ON/OFF (operation/stop) of the adaptation process of the LMS core 8b in the characteristic compensator 7 is controlled, and then the adaptation process is performed during a predetermined time. During the rest time, the adaptation filter of the LMS core 8b is operated as an equalizer by means of an obtained coefficient (a final coefficient maintained when the adaptation process is stopped) or a fixed coefficient. The object of the present invention can be obtained by repeating the operation.

As described above, according to the receiver of the sixth embodiment, in the output of the orthogonal detector 2, when the image signal of the undesired signal existing in the quasi-desired signal is compensated by means of a replica of the image signal in the undesired signal generated from the preparatory desired signal, the adaptation process is introduced in the characteristic compensator 7 used in the first embodiment, thereby excellently compensating for an orthogonal error according to a characteristic variation of the orthogonal detector 2.

Further, the above-described second, fourth and sixth embodiment may employ the characteristic compensator, which has introduced the adaptation process, described with reference to FIG. 13 in the seventh embodiment as the characteristic compensator 7, thereby excellently compensating for an orthogonal error according to a characteristic variation of the orthogonal detector 2, like the seventh embodiment.

An Eighth Embodiment

A eighth embodiment of the present invention is described.

Figure 14:
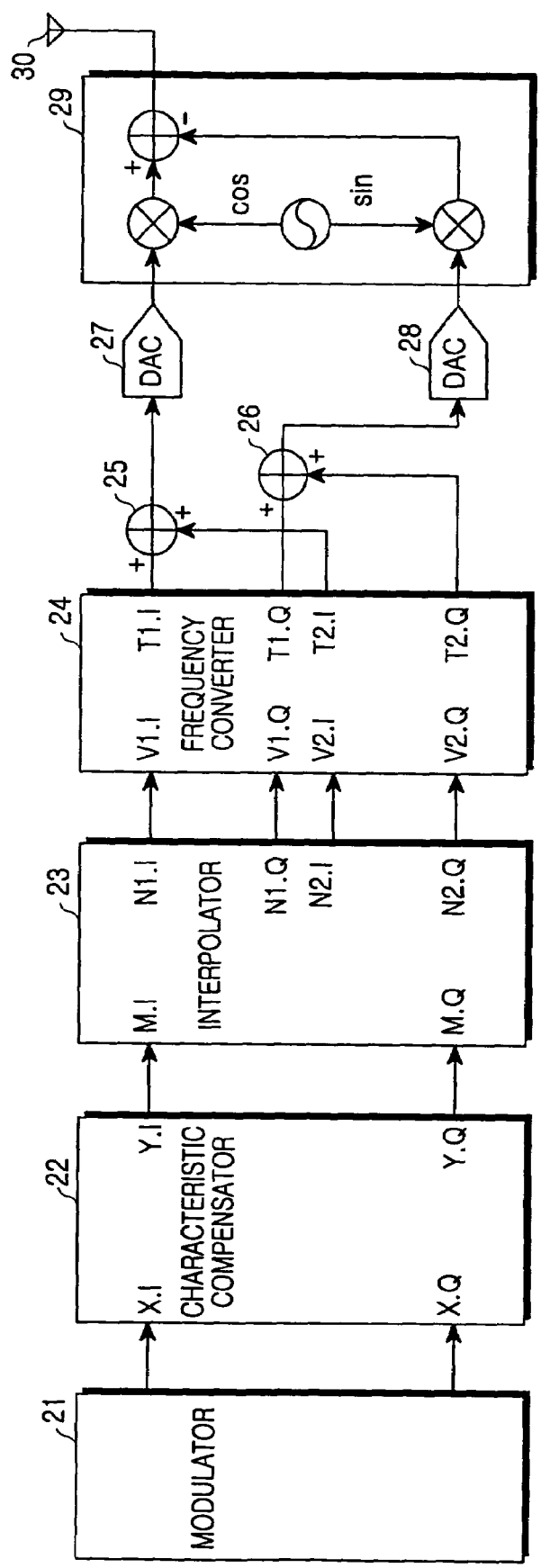
FIG. 14 is a block diagram showing a construction of a transmitter realized in a radio equipment according to an eighth embodiment of the present invention.

FIG. 14 is a block diagram showing a construction of a transmitter realized in a radio equipment according to the eighth embodiment of the present invention.

The transmitter according to the eighth embodiment of the present invention is described with reference to FIG. 14. In the transmitter, a modulator 21 prepares a complex carrier signal of a perpendicular intersecting intermediate frequency (IF frequency), and then generates a transmission signal by modulating the complex carrier signal to transmission data.

In a characteristic compensator 22, an orthogonality error between a real-axis signal and an imaginary-axis signal occurring after the modulator 21 is compensated, and then a reverse characteristic of the orthogonality error is added in advance, thereby generating a synthesis transmission signal between the original complex carrier signal and a complex codomain signal of a corresponding complex carrier signal.

In an interpolator 23, a positive/negative frequency component of the synthesis transmission signal is separated by a filtering, and then the separated signal is separated into the original complex carrier signal and the complex codomain signal of the corresponding complex carrier signal. Simultaneously, an upsampling is performed so that a conversion to an analog signal can be easily performed.

A frequency of the separated original complex carrier signal is frequency-converted to complex codomain frequency of an input frequency of an orthogonal modulator 29 by a frequency converter 24. A frequency of the separated the complex codomain signal of the corresponding complex carrier signal is frequency-converted to a complex codomain frequency of a corresponding input frequency by the frequency converter 24.

A real-axis signal is synthesized to a real-axis signal by an adder 25, and an imaginary-axis signal is synthesized to an imaginary-axis signal by an adder 26, and the real-axis signal and the imaginary-axis signal are converted into analog signals by DAC (D/A converter) 27 and 28. The converted signals are inputted to the orthogonal modulator 29

In the orthogonal modulator 29, the inputted complex signal is frequency-converted to a transmission frequency, and simultaneously only a real-axis signal of the frequency-converted signal is outputted to an antenna 30.

Figure 15:
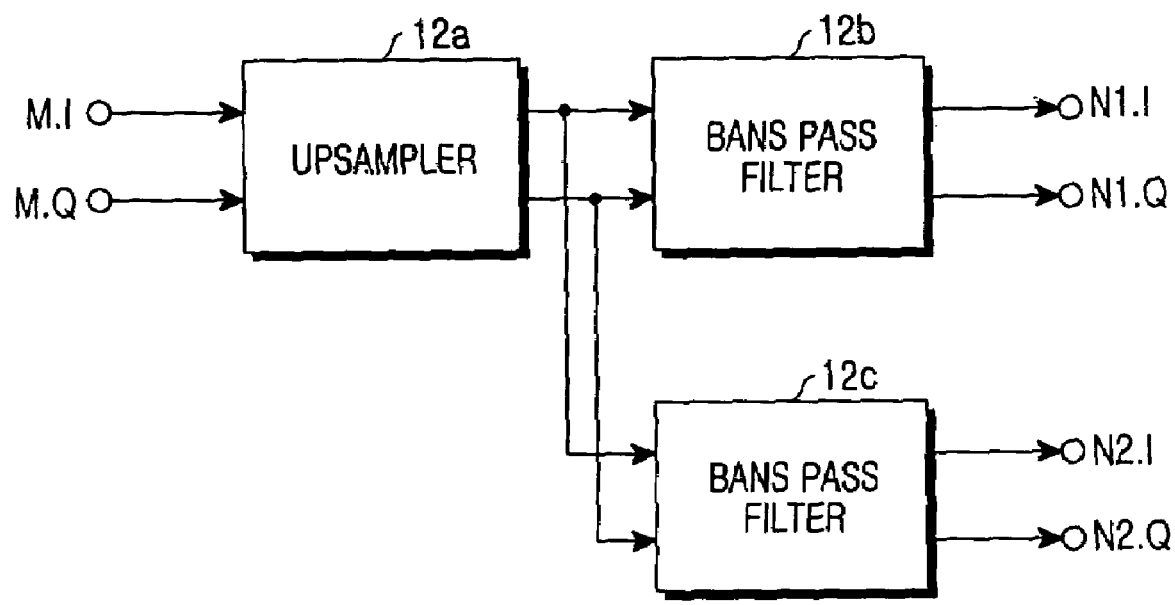
FIG. 15 is a block diagram showing a construction of an interpolator used in a transmitter realized in radio equipment according to an eighth embodiment.

The interpolator 23 is described. As shown in FIG. 15, the interpolator 23 includes an upsampler 12a for interpolating data of signals inputted from terminals M.1, M.Q, and a band pass filter 12b for employing a frequency band of the original complex carrier signal in the output of the characteristic compensator 22 as a pass band, and for extracting the original complex carrier signal, in order to remove a return of the original complex carrier signal and separate the original complex carrier signal and the complex codomain signal in the output of the upsampler 12a.

The interpolator 23 includes a band pass filter 12c for employing a frequency band of the complex codomain signal of the original complex carrier signal in the output of the characteristic compensator 22 as a pass band, and for extracting the complex codomain signal of the original complex carrier signal, in order to remove a return of the original complex carrier signal and separate the original complex carrier signal and the complex codomain signal in the output of the upsampler 12a.

In filter coefficients of the band pass filter 12b and band pass filter 12c, one side of the band pass filter 12b and band pass filter 12c inverts a sign of an imaginary-axis side of a complex filter coefficient prepared in other side of the band pass filter 12b and band pass filter 12c so that the band pass filter 12b and band pass filter 12c can realize a band characteristic symmetrical to a direct current component with a frequency of zero.

A characteristic compensator, which is equal to the characteristic compensator 17 described with reference to FIG. 11 in the fifth embodiment, is utilized as the characteristic compensator 22.

Figure 16:
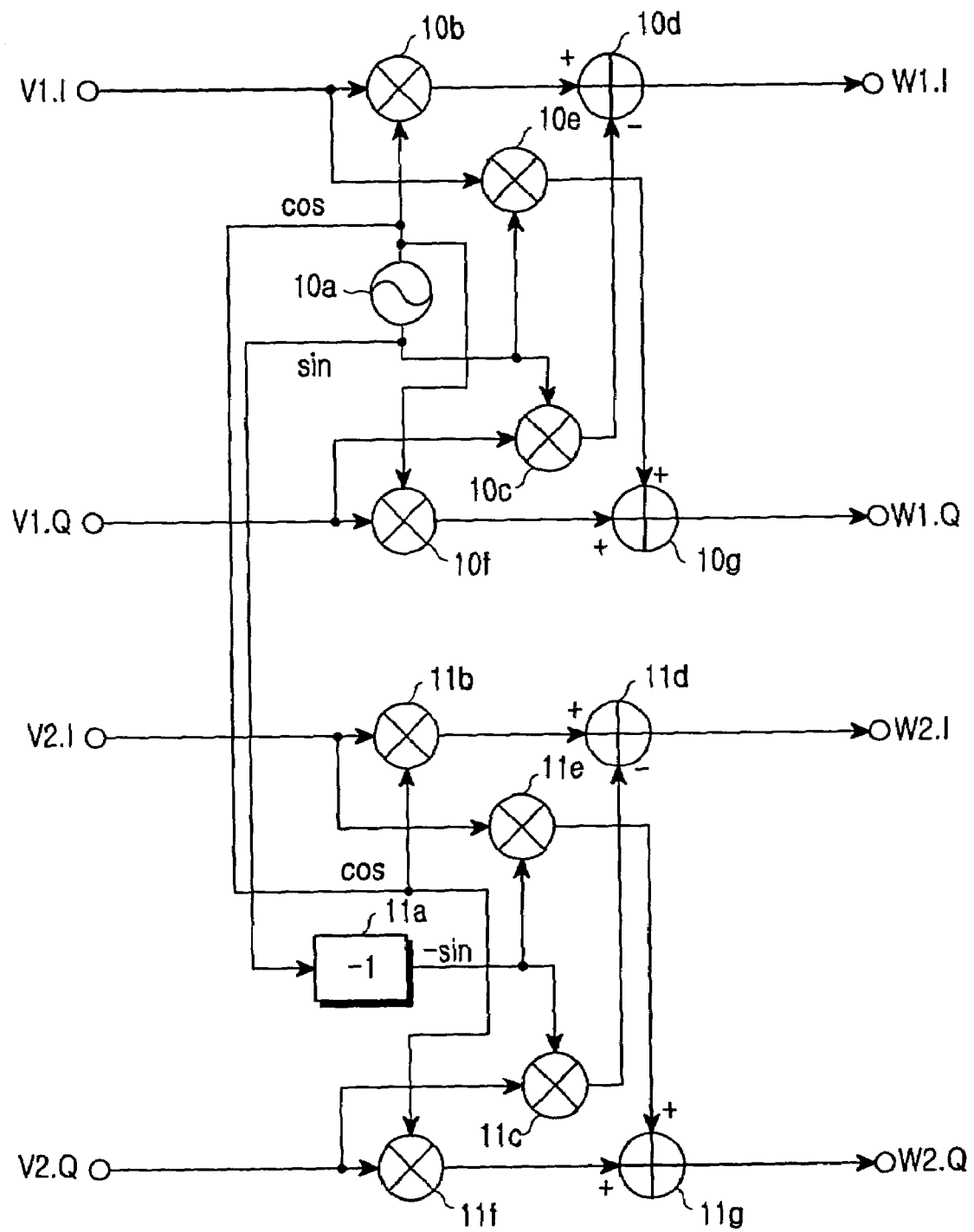
FIG. 16 is a block diagram showing a construction of a frequency converter used in a transmitter realized in radio equipment according to an eighth embodiment.
Figure 17:
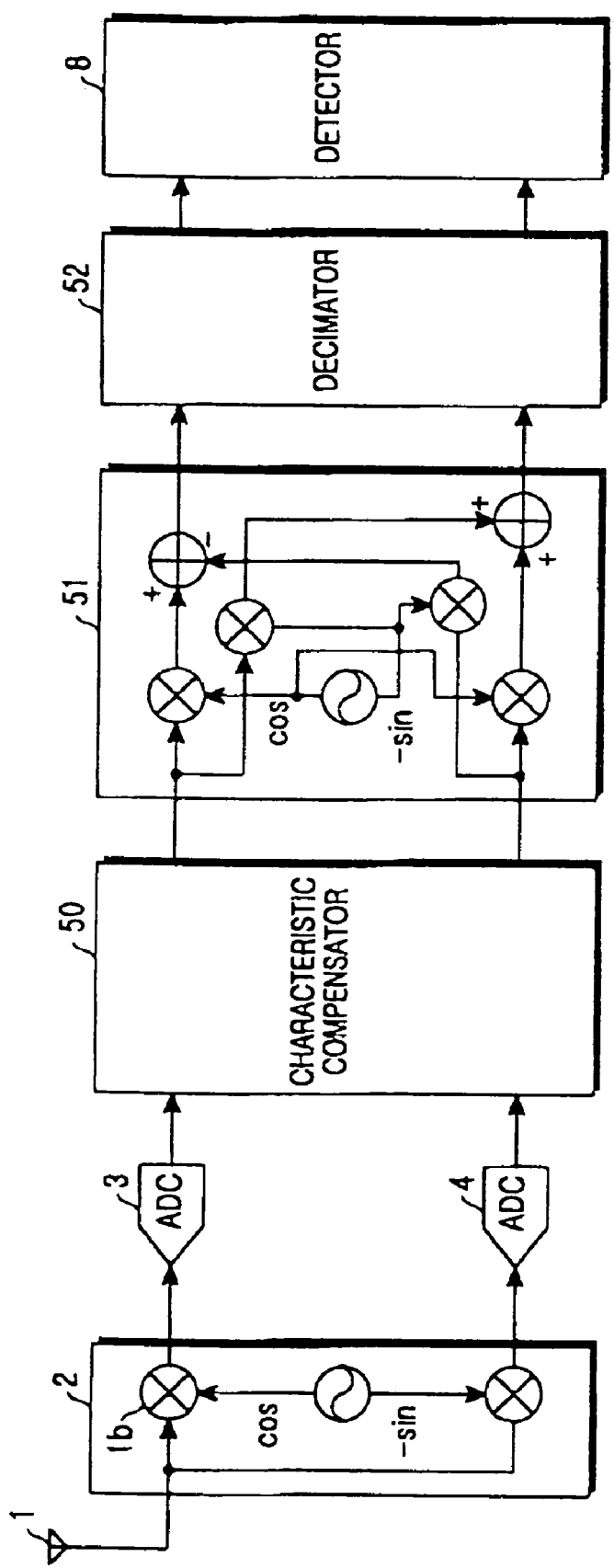
FIG. 17 is a block diagram showing a construction of a conventional receiver.

The frequency converter 24 is described. As shown in FIG. 16, in order to convert the frequency of original complex carrier signal into the input frequency of the orthogonal modulator 29, the frequency converter 24 includes an orthogonal carrier oscillator 10a for outputting a complex local signal of a fourth frequency by a predetermined value lower than the frequency of original complex carrier signal, a multiplier 10b for multiplying a real-axis signal V1.1 of the complex reception signal S1 inputted from a terminal V1.1 by a real-axis signal "cos" of the local signal of the fourth frequency outputted from the orthogonal carrier oscillator 10a, a multiplier 10c for multiplying an imaginary-axis signal V1.Q of the complex reception signal S1 inputted from a terminal V1.Q by an imaginary-axis signal "−sin", of which phase has moved by 90° in relation to the real-axis signal, of the local signal of the fourth frequency outputted from the orthogonal carrier oscillator 10a, and a subtracter 10d for subtracting the output of the multiplier 10c from the output of the multiplier 10b, and then employing the subtraction result as a real-axis signal output W1.1.

The frequency converter 24 includes a multiplier 10e for multiplying the real-axis signal V1.1 of the complex reception signal S1 inputted from the terminal V1.1 by the imaginary-axis signal "sin" of the local signal of the fourth frequency outputted from the orthogonal carrier oscillator 10a, a multiplier 10f for multiplying the imaginary-axis signal V1.Q of the complex reception signal S1 inputted from the terminal V1.Q by the real-axis signal "cos" of the local signal of the fourth frequency outputted from the orthogonal carrier oscillator 10a, and an adder 10g for adding the output of the multiplier 10e to the output of the multiplier 10f, and then employing the result as a imaginary-axis signal output W1.Q.

In order to convert the frequency of the complex codomain signal of the original complex carrier signal into a complex codomain frequency of the input frequency of the orthogonal modulator 29, the frequency converter 24 includes a sign inverter 11a for inverting a sign of the imaginary-axis signal outputted from the orthogonal carrier oscillator 10a, and then obtaining complex codomain signal of local signal of the fourth frequency, a multiplier 11b for multiplying the real-axis signal V2.1 of the complex reception signal S1 inputted from a terminal V2.1 by a real-axis signal "cos" of a local signal of a fifth frequency generated as the complex codomain signal of the local signal of the fourth frequency outputted from the orthogonal carrier oscillator 10a, a multiplier 11c for multiplying the imaginary-axis signal V2.Q of the complex reception signal S1 inputted from the terminal V2.Q by an imaginary-axis signal "−sin", of which phase has moved by 90° in relation to the real-axis signal, of the local signal of the fifth frequency generated as the complex codomain signal of the local signal of the fourth frequency outputted from the orthogonal carrier oscillator 10a, and a subtracter 11d for subtracting the output of the multiplier 11c from the output of the multiplier 11b, and then employing the subtraction result as a real-axis signal output W2.1.

The frequency converter 24 includes a multiplier 1e for multiplying the real-axis signal v2.1 of the complex reception signal S1 inputted from the terminal V2.1 by the imaginary-axis signal "−sin" of the local signal of the fifth frequency generated as the complex codomain signal of the local signal of the fourth frequency outputted from the orthogonal carrier oscillator 10a, a multiplier 11f for multiplying the imaginary-axis signal V2.Q of the complex reception signal S1 inputted from the terminal V2.Q by the real-axis signal "cos" of the local signal of the fifth frequency generated as the complex codomain signal of the local signal of the fourth frequency outputted from the orthogonal carrier oscillator 10a, and an adder 11g for adding the output of the multiplier 11e to the output of the multiplier 11f, and then employing the result as a signal output W2.Q of a imaginary-axis signal.

Instead of the orthogonal carrier oscillator 10a, an orthogonal carrier oscillator, which outputs a complex local signal for converting the frequency of complex codomain signal of original complex carrier signal into a complex codomain frequency of the input frequency of the orthogonal modulator 29, may be utilized. A complex codomain signal of a complex local signal outputted from a corresponding orthogonal carrier oscillator may be utilized as the complex local signal for frequency-converting the frequency of original complex carrier signal into the input frequency of the orthogonal modulator 29.

In the transmitter according to the above-described eighth embodiment, the same effect can be obtained even if the frequency converter 24 is located in front of the band pass filter 12b/12c included in the interpolater 23. However, the pass frequency band of the band pass filter 12b and 12c must match with a frequency band of the original complex carrier signal and a frequency band of the complex codomain signal of the original complex carrier signal in the output of the frequency converter 24.

As described above, according to the transmitter of the eighth embodiment, with respect to a signal with low immediate frequency, the characteristic compensator 22 performs a compensation process of an orthogonality error with the low sampling frequency intact. In the compensated signal, a sampling frequency and a transmission frequency are adjusted by the interpolator 23 and the frequency converter 24, thereby reducing the amount of operation in the characteristic compensator 22.

In the above-described first to eighth embodiment, the characteristic compensator 7, the characteristic compensator 17 and the characteristic compensator 22 are digital circuits, and the characteristic compensation process of the orthogonality error in the complex signal is performed by a digital signal processing. However, as the first to eighth embodiment, without an A/D conversion or a D/A conversion, the characteristic compensation process of orthogonal error in the complex signal may be performed by the characteristic compensators of analog circuits in a state in which signals are maintained as analog signals.

In this case, even in the characteristic compensation process by means of an analog circuit, since the compensation process is performed in low frequency below a RF frequency or a IF frequency, the compensation having high accuracy can be performed even if a passive circuit is used. Accordingly, it is always unnecessary to use an active circuit with a high consumption power in an operation state, thereby reducing the consumption power.

According to the present invention, in a state in which a target signal and a non-target signal in an output of orthogonal detector are kept as signals of a frequency symmetrical to a direct current component with a frequency of zero, the target signal and the non-target signal are converted into signals of a frequency more close to a direct current component, and then the converted signals are inputted to a characteristic compensator for compensating for an orthogonality error of the orthogonal detector, thereby compensating for the orthogonality error of the orthogonal detector by means of a characteristic compensator with a low sampling frequency. Accordingly, the consumption power in the characteristic compensator for compensating for an orthogonality error of a complex signal can be reduced, thereby realizing a radio equipment capable of transceiving signals with no distortion.

A target signal and a non-target signal in an output of modulator are close to a direct current component with a frequency of zero, and the target signal and the non-target signal are simultaneously generated as signals of a frequency symmetrical to a corresponding direct current component. Simultaneously, a frequency of a target signal and a non-target signal in an output of a characteristic compensator is converted into a signal of transmission frequency, thereby compensating for the orthogonality error of the orthogonal modulator by means of a characteristic compensator with a low sampling frequency. Accordingly, the consumption power in the characteristic compensator for compensating for an orthogonality error of a complex signal can be reduced, thereby realizing a radio equipment capable of transceiving signals with no distortion.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A radio equipment comprising:
   an orthogonal detector for obtaining a complex intermediate frequency signal with respect to a real input signal;
   a first frequency converter for frequency-converting a target signal outputted from the orthogonal detector into a signal with lower frequency;
   a second frequency converter for frequency-converting a non-target signal outputted from the orthogonal detector into a signal of a frequency symmetrical to a signal outputted from the first frequency converter and a direct current component with a frequency of zero; and
   a characteristic compensator for compensating for an orthogonality error between a real-axis signal and an imaginary-axis signal occurring in the target signal owing to the orthogonal detector by means of an output signal of the second frequency converter, with respect to an output signal of the first frequency converter.

2. The radio equipment as claimed in claim 1, wherein one side of one of the first frequency converter and second frequency converter utilizes a complex codomain signal of a complex local signal used in other side of one of the first frequency converter and second frequency converter as own local signal.

3. The radio equipment as claimed in claim 1, further comprising:

a first filter for employing a frequency band of the target signal in the output of the orthogonal detector as a pass band and extracting the target signal from the output signal of the orthogonal detector; and a second filter having a pass band characteristic symmetrical to a direct current component with a frequency of zero, for employing a frequency band of the non-target signal in the output of the orthogonal detector as a pass band, and extracting the non-target signal from the output signal of the orthogonal detector;

wherein an output of the first filter is frequency-converted to a signal with lower frequency by the first frequency converter, and an output of the second filter is frequency-converted to a signal of a frequency symmetrical to the signal outputted from the first frequency converter and the direct current component with a frequency of zero by the second frequency converter.

4. The radio equipment as claimed in claim 1, further comprising:

a first filter for employing a frequency band of the target signal in the output of the first frequency converter as a pass band and extracting the target signal from the output signal of the first frequency converter; and a second filter having a pass band characteristic symmetrical to a direct current component with a frequency of zero, for employing a frequency band of the non-target signal in the output of the second frequency converter as a pass band, and extracting the non-target signal from the output signal of the second frequency converter;

wherein the characteristic compensator compensate for an orthogonality error between a real-axis signal and an imaginary-axis signal occurring in the target signal owing to the orthogonal detector by means of an output signal of the second filter, with respect to an output signal of the first filter.

5. The radio equipment as claimed in claim 3, wherein the first filter and the second filter are complex filters for receiving/outputting a complex signal, one side of one of the first filter and second filter inverts a sign of an imaginary-axis side of a complex filter coefficient prepared in other side of one of the first filter and second filter so that the first filter and the second filter can realize a band characteristic symmetrical to a direct current component with a frequency of zero.

6. The radio equipment as claimed in claim 3, wherein the first filter and the second filter are filters for suppressing unnecessary frequency component through a phase process utilizing Hilbert transform.

7. A radio equipment comprising:
   a modulator for modulating a complex intermediate frequency signal to transmission data;
   a characteristic compensator for compensating for an orthogonality error between a real-axis signal and an imaginary-axis signal occurring after a corresponding modulator with respect to the modulated complex immediate frequency signal outputted from the modulator;
   a first frequency converter for frequency-converting a target signal outputted from the characteristic compensator into a signal with higher frequency;
   a second frequency converter for frequency-converting a non-target signal outputted from the characteristic compensator into a signal of a frequency symmetrical to a signal outputted from the first frequency converter and a direct current component with a frequency of zero;

an adder for adding a real-axis signal of a complex signal outputted from the first frequency converter to a real-axis signal of a complex signal outputted from the second frequency converter, and adding an imaginary-axis signal of a complex signal outputted from the first frequency converter to an imaginary-axis signal of a complex signal outputted from the second frequency converter; and an orthogonal modulator for obtaining a real output signal with respect to a complex signal outputted from the adder.

8. The radio equipment as claimed in claim 7, wherein one side of one of the first frequency converter and second frequency converter utilizes a complex codomain signal of a complex local signal used in other side of one of the first frequency converter and second frequency converter as own local signal.

* * * * *